US011772259B1

(12) United States Patent
Kiehl et al.

(10) Patent No.: US 11,772,259 B1
(45) Date of Patent: Oct. 3, 2023

(54) ENHANCED ACTIVATED EXOSKELETON SYSTEM

(71) Applicant: Aptima, Inc., Woburn, MA (US)

(72) Inventors: Zachary Kiehl, Dayton, OH (US); Danielle Ward, Haverhill, MA (US); Patrick Cummings, Brighton, MA (US); Deepak Sathyanarayan, Burlington, MA (US)

(73) Assignee: Aptima, Inc., Woburn, MA (US)

( * ) Notice: Subject to any disclaimer, the term of this patent is extended or adjusted under 35 U.S.C. 154(b) by 750 days.

(21) Appl. No.: 16/782,954

(22) Filed: Feb. 5, 2020

Related U.S. Application Data

(60) Provisional application No. 62/801,673, filed on Feb. 6, 2019.

(51) Int. Cl.
    *G05B 19/04* (2006.01)
    *B25J 9/00* (2006.01)
    (Continued)

(52) U.S. Cl.
    CPC .............. *B25J 9/0006* (2013.01); *A61H 3/00* (2013.01); *B25J 9/161* (2013.01); *B25J 9/163* (2013.01);
    (Continued)

(58) Field of Classification Search
    CPC . B25J 9/0006; B25J 9/161; B25J 9/163; B25J 13/087; A61H 3/00;
    (Continued)

(56) References Cited

U.S. PATENT DOCUMENTS 8,622,938 B2 *  1/2014  Sankai ................. A61F 5/0102
                                                    601/5
8,652,218 B2    2/2014  Goldfarb et al.
                        (Continued)

FOREIGN PATENT DOCUMENTS

WO     2014194257 A1    12/2014

OTHER PUBLICATIONS

Anam, K. et al., "Active Exoskeleton Control Systems: State of the Art", Proceedings of the International Symposium on Robotics and Intelligent Sensors 2012 (IRIS 2012), Procedia Engineering, Elsevier Ltd., Jember, Indonesia, vol. 41, (2012), pp. 988-994.
(Continued)

*Primary Examiner* — Harry Y Oh
(74) *Attorney, Agent, or Firm* — John J. Brooks, III

(57) ABSTRACT

An enhanced exoskeleton system is disclosed comprising an exoskeleton, a base layer comprising at least one sensor, an exoskeleton actuator configured to actuate the exoskeleton, a control subsystem comprising one or more processors, and memory elements including instructions that, when executed, cause the processors to perform operations comprising: receiving sensor data from the sensor, determining a future movement intent of a user of the exoskeleton, determining a command for an exoskeleton actuator based on the future movement intent, and communicating the command to the exoskeleton actuator whereby the exoskeleton is actuated by the exoskeleton actuator. In some embodiments, the sensor data comprises an anticipatory data value from an anticipatory sensor. In some embodiments, the sensor data comprises an anticipatory data value from an electromyography (EMG) sensor.

11 Claims, 15 Drawing Sheets

(51) Int. Cl.
*A61H 3/00* (2006.01)
*B25J 9/16* (2006.01)
*B25J 13/08* (2006.01)

(52) U.S. Cl.
CPC ..... *B25J 13/087* (2013.01); *A61H 2201/1207* (2013.01); *A61H 2201/5007* (2013.01); *A61H 2201/5058* (2013.01); *A61H 2201/5097* (2013.01); *A61H 2205/10* (2013.01)

(58) Field of Classification Search
CPC .... A61H 2201/1207; A61H 2201/5007; A61H 2201/5058; A61H 2201/5097; A61H 2205/10
See application file for complete search history.

(56) References Cited

U.S. PATENT DOCUMENTS

| | | | |
|---|---|---|---|
| 9,842,168 | B2 | 12/2017 | Heck et al. |
| 10,124,484 | B1* | 11/2018 | Barnes .................. B25J 9/0006 |
| 2008/0009771 | A1 | 1/2008 | Perry et al. |
| 2010/0328319 | A1* | 12/2010 | Ikenoue ................ A63F 13/213 |
| | | | 345/474 |
| 2014/0221894 | A1 | 8/2014 | Nagasaka |
| 2015/0170032 | A1* | 6/2015 | Hodes .................... G06F 1/1694 |
| | | | 706/46 |
| 2015/0378600 | A1* | 12/2015 | Sloan .................... G06F 3/0482 |
| | | | 715/773 |
| 2017/0259427 | A1 | 9/2017 | Asada et al. |
| 2018/0221237 | A1* | 8/2018 | Swift ..................... G16H 50/70 |

OTHER PUBLICATIONS

Arvetti, M. et al., "Classification of EMG Signals through wavelet analysis and neural networks for controlling an active hand prosthesis", 2007 IEEE 10th Int. Conf. Rehab. Robotics, Jun. 2007, pp. 531-536.

Ayrulu-Erdem, B. et al., "Leg Motion Classification with Artificial Neural Networks using Wavelet-Based Features of Gyroscope Signals", Sensors, (Basel, Switzerland), vol. 11, (2011), pp. 1721-1743.

Cummings, P. et al., Classifying User Actions With Electromyography and Inertial Measurement Unit Signals.

De Luca, C. et al., "Filtering the Surface EMG Signal: Movement Artifact and Baseline Noise Contamination", J. Biomech., vol. 43, Mar. 2010, pp. 1573-1679.

Domingos, P., "A Few Useful Things to Know About Machine Learning", Commun. ACM, vol. 55, No. 10, Oct. 2012, pp. 78-87.

Farrell, T. R. et al., "The Optimal Controller Delay for Myoelectric Prostheses", IEEE Transactions on Neural Systems and Rehabilitation Engineering, vol. 15, No. 1, (Mar. 2007), pp. 111-118.

[No Author], Harvard Biodesign Lab, Augmenting and Restoring Human Performance, "Soft Exosuits", Retrieved online: Available online at: https://biodesign.seas.harvard.edu/soft-exosuits (accessed Dec. 26, 2019), 6 pgs.

He, Z. et al., "Activity Recognition from Acceleration Data Based on Discrete Consine Transform and SVM", 2009 IEEE International Conference on Systems, Man and Cybernetics, San Antonio, TX (Oct. 2009), pp. 5041-5044.

Hermens, H. et al., SENIAM 8, "European Recommendations for Surface Electromyography", Roessingh Research Development, vol. 8, (1999), pp. 13-54.

Marinov, B., "19 Military Exoskeletons into 5 Categories", Available online at: https://exoskeletonreport.com/2016/07/military-exoskeletons/(accessed Dec. 26, 2019), 16 pgs.

Papoulis, A., "The Fourier Integral and Its Applications", McGraw-Hill Electronic Science Series, (1962), 328 pages.

Pedregosa, F. et al., "Scikit-learn: Machine Learning in Python", Journal of Machine Learning Research, vol. 12, (2011), pp. 2825-2830.

Phinyomark, A. et al., "Application of Wavelet Analysis in EMG Feature Extraction for Pattern Classification", Meas. Sci. Rev., vol. 11, (Jun. 2011), pp. 45-52.

Randell, C. et al., "Context Awareness by Analysing Accelerometer Data", Digest of Papers, Fourth International Symposium on Wearable Computers, (2000), pp. 175-176.

Routhier, F. et al., "Clinical results of an investigation of paediatric upper limb myoelectric prosthesis fitting at the Quebec Rehabilitation Institute", Prosthetics and Orthotics International, Quebec City, Canada, (2001), vol. 25, pp. 119-131.

Schulze, C. et al., "The Influence in Air Force Soldiers through wearing certain types of Army-Issue Footwear on Muscle Activity in the Lower Extremities", The Open Orthopaedics Journal, vol. 5, No. 1, (Oct. 2011), pp. 302-306.

Szegedy, C. et al., "Intriguing Properties of Neural Networks", Computer Science, (2014), 10 pgs.

Trunk, G. V., "A Problem of Dimensionality: A Simple Example", IEEE Trans. Pattern Anal. Mach. Intell., vol. PAMI-1, No. 3, (Jul. 1979), pp. 306-307.

Um, T. T. et al., "Exercise Motion Classification from Large-Scale Wearable Sensor Data Using Convolutional Neural Networks", Department of Electrical and Computer Engineering, University of Waterloo, Waterloo, ON, Canada, 6 pgs.

Vanrell, S. et al., "Assessment of Homomorphic Analysis for Human Activity Recognition from Accelerations Signals", IEEE J. Biomed. Health Inform., vol. PP, (Jul. 2017), 22 pgs.

Catal et al., On the Use of Ensemble of Classifiers for Accelerometer-based Activity Recognition, Applied Soft Computing, 2015, http://dx.doi.org/10.1016/j.asoc.2015.01.025. 5 pages.

Chen et al., A Deep Learning Approach to Human Activity Recognition Based on Single Accelerometer, 2015 IEEE Conference on Systems, Man, and Cybernetics, Hong Kong, China, Oct. 9-12, 2015, pp. 1488-1492.

Chollet, Keras, github.com/fchollet/keras-resources. May 22, 2015, Accessed online on Jan. 9, 2023 via the Wayback Machine at http://web.archive.org/web/20150522055317/https://github.com/fchollet/keras, 9 pages.

Schulze, The Influence in Airforce Soldiers Through Wearing Certain Types of Army-Issue Footwear on Muscle Activity in the Lower Extremities, The Open Orthopaedics Journal, vol. 5, No. 1, Oct. 2011, pp. 302-306.

Chung et al., Within- and Between-Session Consistency of Electromyographic Temporal Patterns of Walking in Non-Disabled Older Adults, Gait & Posture, vol. 6, Issue 2, Oct. 1997, pp. 110-118.

Criswell, Cram's Introduction to Surface Electromyography, 2nd Edition, Book Review posted by Daryl Lawson, Medicine & Science in Sports & Exercise, vol. 43(7), Jul. 2011, p. 1378.

Gao et al., From Fourier Transform to Wavelet Transform: A Historical Perspective. Chapter 2 In: Wavelets. Boston, MA: Springer US, 2011, pp. 17-32.

Hermens et al., Development of Recommendations for SEMG Sensors and Sensor Placement Procedures, Journal of Electromyography and Kinesiology, vol. 10, Issue 5, Oct. 2000, pp. 361-374.

Lara et al., A Mobile Platform for Real-time Human Activity Recognition, 6th IEEE International Workshop on Personalized Networks, 2012, pp. 667-671.

Li et al., Power Spectral Analysis of Surface Electromyography (EMG) at Matched Contraction Levels of the First Dorsal Interosseous Muscle in Stroke Survivors, Clinical Neurophysiology, vol. 125, Issue 5, May 2014, pp. 988-994.

Scott et al., Myoelectric Prostheses: State of the Art, Journal of Medical Engineering & Technology, vol. 12, No. 4, Jul./Aug. 1988, pp. 143-151.

Suto et al., Comparison of Offline and Real-time Human Activity Recognition Results Using Machine Learning Techniques, Neural Computing and Applications, vol. 32, Oct. 2020, pp. 15673-15686. Originally published online Mar. 20, 2018. 14 pages.

* cited by examiner

| Algorithm \ Sensors | All | IMU | EMG | Pres. | IMU & EMG |
|---|---|---|---|---|---|
| Participant # 2 | | | | | |
| K-NN (cust. dist.) | 0.97 | 0.97 | 0.81 | 0.49 | 0.98 |
| K-NN (Euclidean) | 0.93 | 0.93 | 0.45 | 0.54 | 0.94 |
| SVM | 0.11 | 0.11 | 0.30 | 0.53 | 0.11 |
| ANN | 0.91 | 0.91 | 0.59 | 0.46 | 0.91 |
| Participant # 3 | | | | | |
| K-NN (cust. dist.) | 0.97 | 0.95 | 0.80 | 0.44 | 0.97 |
| K-NN (Euclidean) | 0.92 | 0.93 | 0.63 | 0.46 | 0.93 |
| SVM | 0.11 | 0.11 | 0.59 | 0.49 | 0.11 |
| ANN | 0.85 | 0.88 | 0.62 | 0.48 | 0.86 |

| Algorithm \ Sensors | All | IMU | EMG | Pres. | IMU & EMG |
|---|---|---|---|---|---|
| Participant # 2 | | | | | |
| K-NN (cust. dist.) | 0.63 | 0.85 | 0.23 | 0.33 | 0.55 |
| K-NN (Euclidean) | 0.25 | 0.26 | 0.16 | 0.35 | 0.23 |
| SVM | 0.11 | 0.11 | 0.21 | 0.35 | 0.11 |
| ANN | 0.35 | 0.36 | 0.23 | 0.36 | 0.35 |
| Participant # 3 | | | | | |
| K-NN (cust. dist.) | 0.63 | 0.67 | 0.34 | 0.29 | 0.60 |
| K-NN (Euclidean) | 0.67 | 0.67 | 0.28 | 0.31 | 0.67 |
| SVM | 0.11 | 0.11 | 0.35 | 0.25 | 0.11 |
| ANN | 0.63 | 0.61 | 0.32 | 0.20 | 0.59 |

ENHANCED ACTIVATED EXOSKELETON SYSTEM

CROSS-REFERENCE TO RELATED APPLICATIONS

This application claims the benefit of U.S. Pat. App. No. 62/801,673 filed on Feb. 6, 2019, entitled "ENHANCED ACTIVATED EXOSKELTON SYSTEM" and the entire contents of which are incorporated herein by reference.

STATEMENT REGARDING FEDERALLY SPONSORED RESEARCH OR DEVELOPMENT

This invention was made with Government support under W911NF-17-C-0062 awarded by US Army. The Government has certain rights in the invention.

REFERENCE TO SEQUENCE LISTING, A TABLE, OR A COMPUTER PROGRAM LISTING COMPACT DISC APPENDIX

Not Applicable.

BACKGROUND

This disclosure relates to enhancements for human-machine systems, in particular enhancements to human-machine systems that recognize an intention of the machine user to help control functions of the machine. For example, and not for limitation, embodiments may recognize the intention of a user to help control the function of an exoskeleton.

DESCRIPTION OF THE PRIOR ART

The expansion and availability of wearable sensing technology has led to persistent data collection in many domains. The resulting plethora of data—coupled with the advancement of computer processing capabilities—has allowed for the real-world application of numerous machine-learning techniques.

Previous attempts to build a powered exoskeleton have been inadequate for various reasons. In some cases, exoskeleton prototypes or systems seldom exhibit acceptable levels of resiliency, flexibility, and response to user input. Actuated exoskeletons are especially plagued by this challenge, as the ability for real-time input is hindered by the required sensing technology and lag in data-processing routines.

Although novel advances have been made in domains such as myoelectric prostheses, brain computer interfaces (BCI), or biomechantronics, there is a clear need for holistic systems that can classify and predict human motor intent for use within actuated exoskeletons.

Simply stated, most current actuated exoskeletons share similar weaknesses—they have too many components (e.g., actuators) and are difficult to control and power for extended periods of time.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

The enhanced exoskeleton system inventors recognized that current exoskeleton prototypes or systems seldom exhibit acceptable levels of resiliency, flexibility, and response to user input. Actuated exoskeletons are especially plagued by this challenge, as the ability for real-time input is hindered by the required sensing technology and lag in data-processing routines. Although novel advances have been made in domains such as myoelectric prostheses, brain computer interfaces (BCI), or biomechantronics, there is a clear need for holistic systems that can classify and predict human motor intent for use within actuated exoskeletons. Simply stated, most current actuated exoskeletons share similar weaknesses—they have too many components (e.g., actuators) and are difficult to control and power for extended periods of time.

The inventors know of very few, if any, full-body exoskeletons which rely on neural command as the primary source for enactment of motion intent.

According to one aspect of the present disclosure, a control subsystem for controlling an actuator based on a future movement intent of a user, the control subsystem comprising a control database storing a historical movement library, a current intent classifier configured to determine a current movement intent of the user based on a sensor data and the historical movement library, a future intent classifier configured to determine a future movement intent of the user based on the current movement intent of the user, a motor control module configured to determine a command to be communicated to an actuator, and the command is based on the future movement intent of the user.

In some embodiments, the sensor data comprises an anticipatory data value from an anticipatory sensor. In some embodiments, the sensor data comprises an anticipatory data value from an electromyography (EMG) sensor. In some embodiments, the sensor data comprises an anticipatory data value from an electromyography (EMG) sensor and the anticipatory data value representing a muscle movement of the user that has not occurred. In some embodiments, the current intent classifier is configured to determine the current movement intent of the user according to a probabilistic pattern recognition technique. In some embodiments, the future intent classifier is configured to determine the future movement intent of the user according to a probabilistic pattern recognition technique. In some embodiments, current intent classifier is configured to determine the current movement intent of the user according to a K-Nearest Neighbor (K-NN) algorithm. In some embodiments, the future intent classifier is configured to determine the future movement intent of the user according to a K-NN algorithm. In some embodiments, the control subsystem further comprises a current task classifier configured to determine a current movement task of the user according to a probabilistic pattern recognition technique. In some embodiments, the control subsystem further comprises a current task classifier configured to determine a current movement task of the user according to a K-NN algorithm.

In some embodiments, the control subsystem is part of an enhanced exoskeleton system, the enhanced exoskeleton system comprising a sensor-embedded textile base layer configured to sense the sensor data and communicate the sensor data to the control subsystem; an active exoskeleton in communication with the control subsystem and configured to be controlled by the actuator, and the textile base layer comprises an electromyography (EMG) sensor configured to communicate an anticipatory data value representing a muscle movement yet to occur.

According to one aspect of the present disclosure, an exoskeleton system is provided comprising an exoskeleton, a base layer comprising at least one sensor, an exoskeleton actuator configured to actuate the exoskeleton, a control subsystem comprising one or more processors, and one or more memory elements including instructions that, when executed, cause the one or more processors to perform operations comprising: receiving sensor data from the sensor, determining a future movement intent of a user of the exoskeleton, determining a command for an exoskeleton actuator based on the future movement intent, and communicating the command to the exoskeleton actuator whereby the exoskeleton is actuated by the exoskeleton actuator.

In some embodiments, the sensor data comprises an anticipatory data value from an anticipatory sensor. In some embodiments, the sensor data comprises an anticipatory data value from an electromyography (EMG) sensor. In some embodiments, the future movement intent of the user is determined by a probabilistic pattern recognition technique. In some embodiments, the future movement intent of the user is determined by a K-NN algorithm.

According to one aspect of the present disclosure, a computer-implemented method of actuating an exoskeleton is provided, the method comprising receiving a sensor data from at least one sensor coupled to the exoskeleton, determining a future movement intent of a user of the exoskeleton based on the sensor data, determining a command for an exoskeleton actuator based on the future movement intent, and communicating the command to the exoskeleton actuator whereby the exoskeleton is actuated by the exoskeleton actuator.

Therefore, there is a clear need for innovations in the realm of exoskeleton control based on human motor intent.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
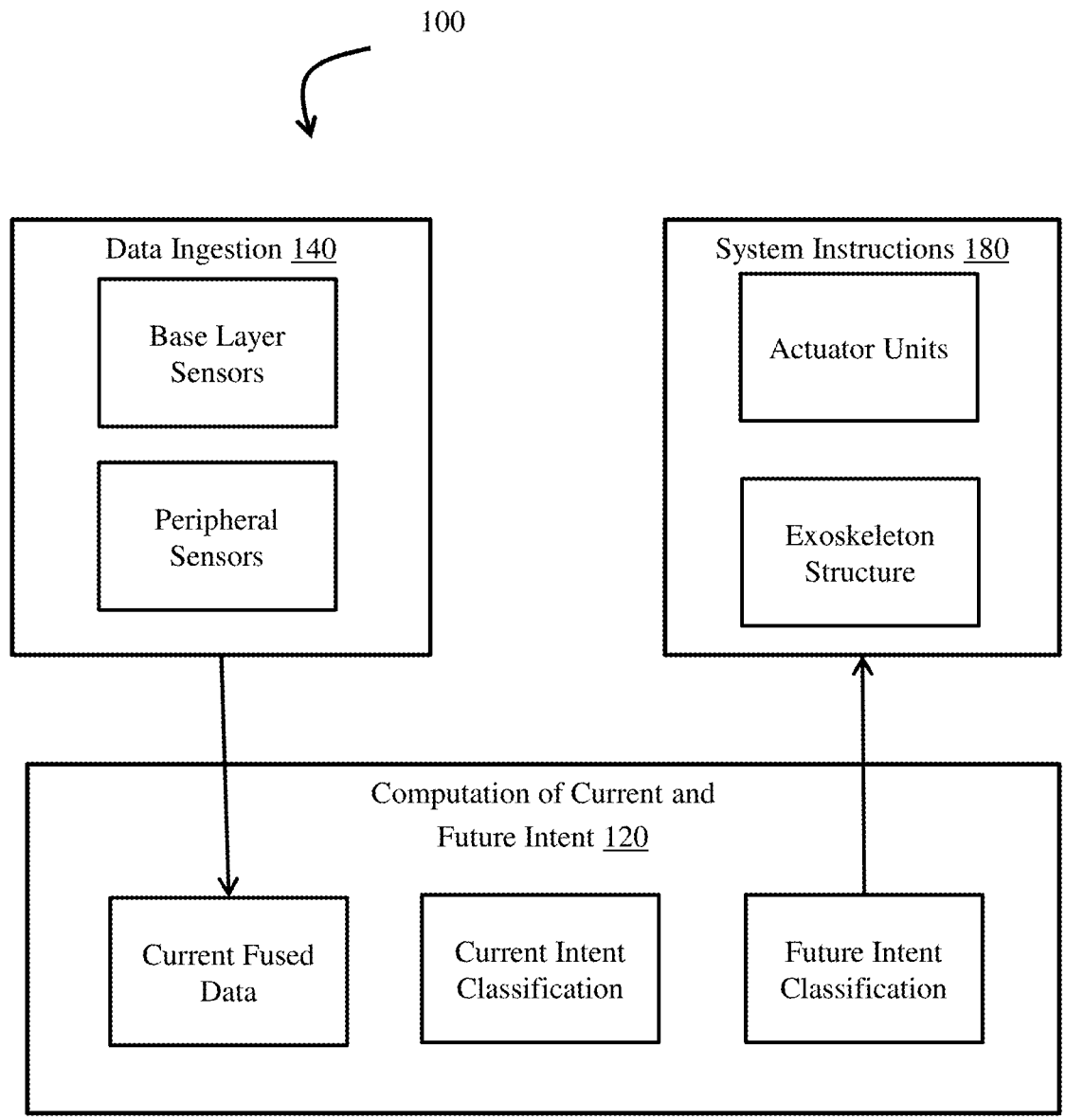
FIG. 1 shows a process diagram illustrating the general concepts of one embodiment of the invention.

COPYRIGHT NOTICE: A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright © 2018, Aptima, Inc., All Rights Reserved.

Enhanced activated exoskeleton systems, or enhanced exoskeleton systems will now be described in detail with reference to the accompanying drawings. It will be appreciated that, while the following description focuses on a system that controls active exoskeletons, the systems and methods disclosed herein have wide applicability. Notwithstanding the specific example embodiments set forth below, all such variations and modifications that would be envisioned by one of ordinary skill in the art are intended to fall within the scope of this disclosure.

As used herein, the term "module" refers to hardware and/or software implementing entities, and does not include a human being. The operations performed by the "module" are operations performed by the respective hardware and/or software implementations, e.g. operations that transform data representative of real things from one state to another state, and these operations do not include mental operations performed by a human being.

The terms "sensor data", as used herein is a broad term and is to be given its ordinary and customary meaning to a person of ordinary skill in the art (and are not to be limited to a special or customized meaning), and furthermore refers without limitation to any data associated with a sensor, such as but not limited to electrocardiogram (ECG), inertial measurement unit (IMU), force sensing resistor (FSR), electromyography (EMG), thermometer, hygrometer, goniometer and camera devices.

Technical Problem

The enhanced exoskeleton systems are directed to improving the control of an actuated exoskeleton, such as that of the U.S. Special Operation Commands Tactical Assault Light Operator Suit (TALOS). The TALOS project seeks to improve the survivability, situational awareness, surgical lethality, and overall human performance capability of special operations forces operators. Regardless of the specific exoskeleton on interest, a satisfactory exoskeleton needs to be both powerful and agile, responding to the operator's movement intentions as naturalistically as possible.

For illustration purposes and not for limitation, example implementations are used in this description which focus on active and hybrid exoskeletons, which augment speed, strength, or endurance through specialized mechanical components and external power sources. The distinction between passive vs active (i.e., actuated) exoskeleton control is significant as it greatly increases the complexity of the problem. Where passive exoskeletons rely on power from the human operator—which is then amplified or augmented based on the principles of elasticity—active exoskeletons use power sources such as batteries or fuel cells to power motors, hydraulics, pneumatics, or a combination based on the specific need. Many functional exoskeletons leverage capabilities from both designs, which are commonly referred to as hybrid exoskeletons. Regardless of the method of power and control, nearly all exoskeletons focus on the augmentation of operator limb strength, endurance, and control.

The overarching problem with active exoskeletons is that they have many components (e.g., actuators) and are difficult to control and power for extended periods of time. Furthermore, the requisite equipment is also bulky, which severely limits the operator's ability to move the exoskeleton in a natural way.

Embodiments of the disclosed enhanced exoskeleton system attempt to provide an enhanced exoskeleton solution by automatically recognizing the movement intentions of the user and then enacting the intended movement within the actuated exoskeleton.

This solution seeks to address two main technical problems in automatically actuating an exoskeleton based on the intentions of the user: (1) how can the system accurately recognize how the user is intending to move (i.e., movement intent via classification); and (2) given the current intentions of the user, how do you determine the future intended motion (i.e., prediction of movement intent)? The specific technical problem of recognizing motor intent based on sensor and classification inputs applies most directly to powered prostheses and exoskeletons.

The solution addresses unique problems related to recognition and classification of the movement intentions of a user, for both "current" and "future" predictions when sensors such as EMG sensors are used. These problems are unique because these types of sensors provide anticipatory indicators of motion, which means that the signal begins to present itself (e.g., muscle begins to fire) before movement actually occurs and therefore predictions have to be made of this "current" intention. These types of sensors may be termed "anticipatory sensors" that sense anticipatory data values of motion intended to happen in the future. For example, in some embodiments, the solution first predicts or classifies the current, near-term, movement intent from sensors before movement occurs. Then, the solution uses this current classification (e.g., user is pushing off their foot in an attempt to walk) as an input source to predict or classify a future intent (e.g., user wants to walk forward). In these embodiments, multiple predictions or classifications are used to enhance the exoskeleton.

While classification and relay of motion intent has been used in domains such as teleoperation, prediction of movement based on sensor inputs, past classifications, and environmental context is a novel solution to the aforementioned problem of human motor intent detection and enactment.

Technical Solution

The enhanced exoskeleton system solves several challenging technical problems associated with assessing, classifying, and predicting operator movement intent within an actuated exoskeleton. The enhanced exoskeleton system uniquely fuses sensors, contextualized environmental information, and previous classifications to be used as inputs to a predictive control system for the actuation of exoskeleton. In some embodiments, the previous classification may comprise near-term preceding classifications. For example, these near-term preceding classifications may comprise 3-7 windows worth of preceding data and if, for example, classifications are made every 50 milliseconds, the previous classifications may comprise those classifications made in a range of about 150-350 milliseconds (0.15-0.35 seconds).

Embodiments of the enhanced exoskeleton system may also utilize machine learning techniques to learn typical motion profiles to improve predictions of user activities and movement. These machine learning techniques would provide input to the classification and prediction modules by providing a feedback mechanism comprised of individualized motion indicators. In some embodiments, the machine learning technique is a K-NN which includes some learning already built in.

As shown in FIG. 1, a functional overview of an example embodiment of an enhanced exoskeleton system 100 can be shown in the three steps or processes: (1) data ingestion from multiple sensors at 140, (2) classifiers configured to compute desired intent at 120, and (3) communication of instructions with exoskeleton subsystems for the enactment of the predicted motion at 180. Each of these functional process components are described in greater detail below.

Data ingestion and sensor fusion at 140: Physiological data that is representative of human movement is preferably gathered at a sufficient frequency (e.g., 1000 Hz.) The data sources may include base layer and peripheral sensors. For this example, embodiment, data sources may include sensors such as, but not limited to the following: (1) EMG sensors for assessing muscle activity and anticipatory muscle movement; (2) IMUs for gathering acceleration, gyroscopic, and magnetic data; (3) FSRs for gathering pressure data from the soles of the feet; and (4) various sensors (described in subsequent section) enabling environmental sensing. These data sources, current classification, and contextual information (e.g., environmental conditions, ground interactions) are fused to be used to predict the motion intent of the exoskeleton operator. These data streams may then be used as inputs to one or more classifiers which classify the current task of the user.

Computation of movement intent and future movement intent at 120: The second component of the technical solution is the actual computation of motion intent. There are numerous data sources that are fused and assessed to classify current operator movement. The current fused data from these data sources are then probabilistically matched against a historical movement library of known movements to determine the current intended activity or movement of the user. This classification may be performed using any type of mathematical model including, but not limited to neural networks, decision trees, support vector machines, regression, random forest and autoregression models. In one embodiment, classification may be completed via a K-NN algorithm with a custom distance function that was developed specifically for an exoskeleton use case. In this example, the classifier ingests the aforementioned fused data and uses the K-NN to then compute a subset of intended gross motor actions, such as walking, pivoting, running, crouching, kneeling, and backpedaling. The current movement intent is classified to help probabilistically determine the intended future movement of the user. The future intent classification may be determined utilizing methods similar to those used for the current intent classification. In one embodiment, this classification is determined by probabilistically matching the current movement intent against a historical library of known future movements to determine the predicted/intended movement of the user. For example, the future intent classification may be completed via a K-NN algorithm similar to that used in recognizing the current intent of the user. In other embodiments, the future intent classification may be determined by other mathematical models such as but not limited to a linear model.

Instructions for exoskeleton system at 180: The third component of the described technical solution focuses on providing instructions to the hardware systems within the exoskeleton. For example, given the movement predictions/intentions from the steps above, these intentions are provided to the onboard computer of the exoskeleton, which relays the motion intent of the exoskeleton wearer to the actuators or load cells on the exoskeleton that control the exoskeleton movement. Some examples of specific hardware include load cells, actuators, hydraulics, or pneumatics.

Taken as a whole, this technical solution allows an exoskeleton to move naturalistically by fusing various data inputs to anticipate, predict, and ultimately provide instructions to exoskeleton motion hardware. This system extends the field of biomimetics by attempting to model, mimic, and extend the human motor system to that of an actuated exoskeleton.

This solution differs from previous solution because (1) it does not rely on electroencephalography (EEG) for anticipatory motor control, (2) it relies on the classification of current motion volition as an input to predict and inform mechanical movement, and (3) it relies on fusion of contextualized information rather than one input source (e.g., EMG). Most exoskeleton controls systems are either passive and rely simply on the kinematics and energy of the human body or are simply localized to one specific joint system (e.g., wrist, knee, ankle).

The known current state of the art includes single methods or data sources are used as an input for exoskeleton control. For example, most of these systems focus on one data source for a specific application, such as EMG input for hand clasping.

The presented solution enhances the known current state of the art by providing systems and methods to classify and predict user activities (i.e., user intent or volition) via a fusion of sensor technologies and contextual information. The specific sensor technologies capture physiological processes, body-segment movement, and environmental conditions and obstacles. The contextual information includes ambient environmental sensing and computer vision to determine motion intent based on the environment.

One specific example illustrating the enhancement provided by the disclosed enhanced exoskeleton system is shown in the detection and relay of user intent to climb a staircase based on (1) a computer vision application recognizing the user is in front of a staircase and (2) the spike in pressure on the ball of foot as detected by the in-sole FSR pressure sensors. This example depicts how physiological data can be fused with environmental data to provide contextualized inputs to exoskeleton actuation. Once this first set of instructions is enacted, the prediction is then based on the classification of prior movement input to predict future intent. The prediction may further incorporate other input such as but not limited to sensor input, environmental input or other contextual inputs. For example, if it is known that a user has climbed up 2 steps of a staircase that has 12 steps, it is very likely that the user intends to continue climbing, especially when coupled with sensor data such as EMG activity in the gastrocnemius or a shift in pressure from the heel to ball of the foot.

Embodiments of the enhanced exoskeleton system may also leverage sampling rates and computational lag times that are consistent with human reaction time (i.e., about 150-300 milliseconds) to avoid unnatural lag times.

This approach of fused sensor and contextual information for predicting human motor intent or volition is believed to be novel over the prior art. Most known prior art systems are developed for one specific application is also noteworthy, as the presented notion is intend to relay instruction to a full-body exoskeleton with a large range of motion (ROM) and range of activities (e.g., walking, running, ascending stairs, and climbing). Thus, this invention differs from currently known solutions by enabling generalizable and contextualized movement classification and prediction (i.e., full range of activities) instead of specific applications for one joint system or activity.

The technical solutions provided are not obvious because: (1) known prior exoskeleton or prosthetic control work has typically focused on one input source in isolation; and (2)

the requisite hardware for collecting the anticipatory human intent data has historically been cumbersome and often confined to laboratory use.

Currently known research in recognizing motor intent is limited but does attempt to recognize the brain's role in motor intent. Human motor intent is primarily controlled by the brain's primary motor cortex. The electrical impulses (i.e., instruction for motion intent) are then transmitted to the appropriate muscles via axons and synaptic terminals. Consistently, because of the physiology of the human motor system starts in the brain, most motor control research either uses EEG (e.g., BCI) or EMG for detection of muscle intent. The use of EEG for operational purposes is often plagued by two factors: (1) acquisition of data with a high signal-to-noise (SNR) ratio typically requires obtrusive equipment; and (2) EEG data is prone to contamination via motion artifact, which is an obvious impediment for exoskeleton applications. Thus, most applied motor intent classification or prediction relies on the subsidiary—from a central nervous perspective—EMG signal.

While the described invention is similar in its utilization of EMG, the novelty lies in the fusion of direct signals, contextualized information, and previous motor classification to provide a more accurate prediction of motion intent. In particular, the use of contextualized information and the use of previous motor classification is unconventional and provides a significantly more accurate prediction of motion intent. This fusion and use of data sources for exoskeleton control is not an obvious solution to a well-documented challenge. As referenced previously, this technical solution is also not apparent because the miniaturization and optimization of requisite technological components is a relatively recent revelation.

The proposed enhanced exoskeleton system leverages new features from a physical object. In this case, there are four physical objects that are required for the use of the described invention. These four physical objects are (1) a sensor-embedded textile base layer, (2) peripheral sensors to detect ambient and contextual environmental conditions, (3) a processor based control subsystem for interpreting and relaying instructions, and (4) an active exoskeleton which is controlled by various electromechanical transducer and actuators. Physical objects 2, 3, and 4 above may be part of the collective exoskeleton. The textile base layer and peripheral sensors are used to gather past and current human state data to be used to produce a prediction of motor intent. The control subsystem then uses this data to produce exoskeleton control instructions to a full-body exoskeleton for augmenting human strength and protection. The control instructions provided are based on contextualized data from the textile base layer and peripheral sensors.

Together these physical objects (1) sense the operator's position, muscle activity, and surrounding environment; (2) assess the operator's motion intent via machine learning control algorithms; and (3) augment the user's movement by enacting the motions predicted by the system.

Practical Application

The disclosed enhanced exoskeleton system necessitates real-time computing because the system controls its environment by receiving data, processing them, and returning the results with sufficient rapidity to affect the environment at that time. This real-time constraint is preferably implemented through a requirement to provide and begin enacting motor intent within 200-300 milliseconds. This computational time requirement necessitates the use of computer-based technology.

Although computers have been used for active exoskeletons, BCIs, and myoelectric prostheses, there have been few attempts to extend this to control systems for the entire body. As such, this system improves computer-based technology by optimizing the method in which the data packets are gathered, compiled, and relayed for instruction.

This system leverages commercially available sensors and components; however, the methods of data collection, motor intent computation, and data packet transmission improves previous methods that leverage computer-based control.

One Example Embodiment of the Enhanced Exoskeleton System:

An example embodiment of many of the components of an exoskeleton system comprises an actuated exoskeleton much like that of the of the U.S. Special Operation Command's TALOS exoskeleton. The specific exoskeleton is not as important as is the method of exoskeleton control. Embodiments of the enhanced exoskeleton system focuses on actuated (i.e., active) exoskeletons that require operator input to perform intended actions. Active exoskeletons are typically heavy and burdensome due to the numerous intricate subcomponents (e.g., batteries, motors, pneumatics, levers, hydraulics, load cells, and support scaffolds).

Figure 2A:
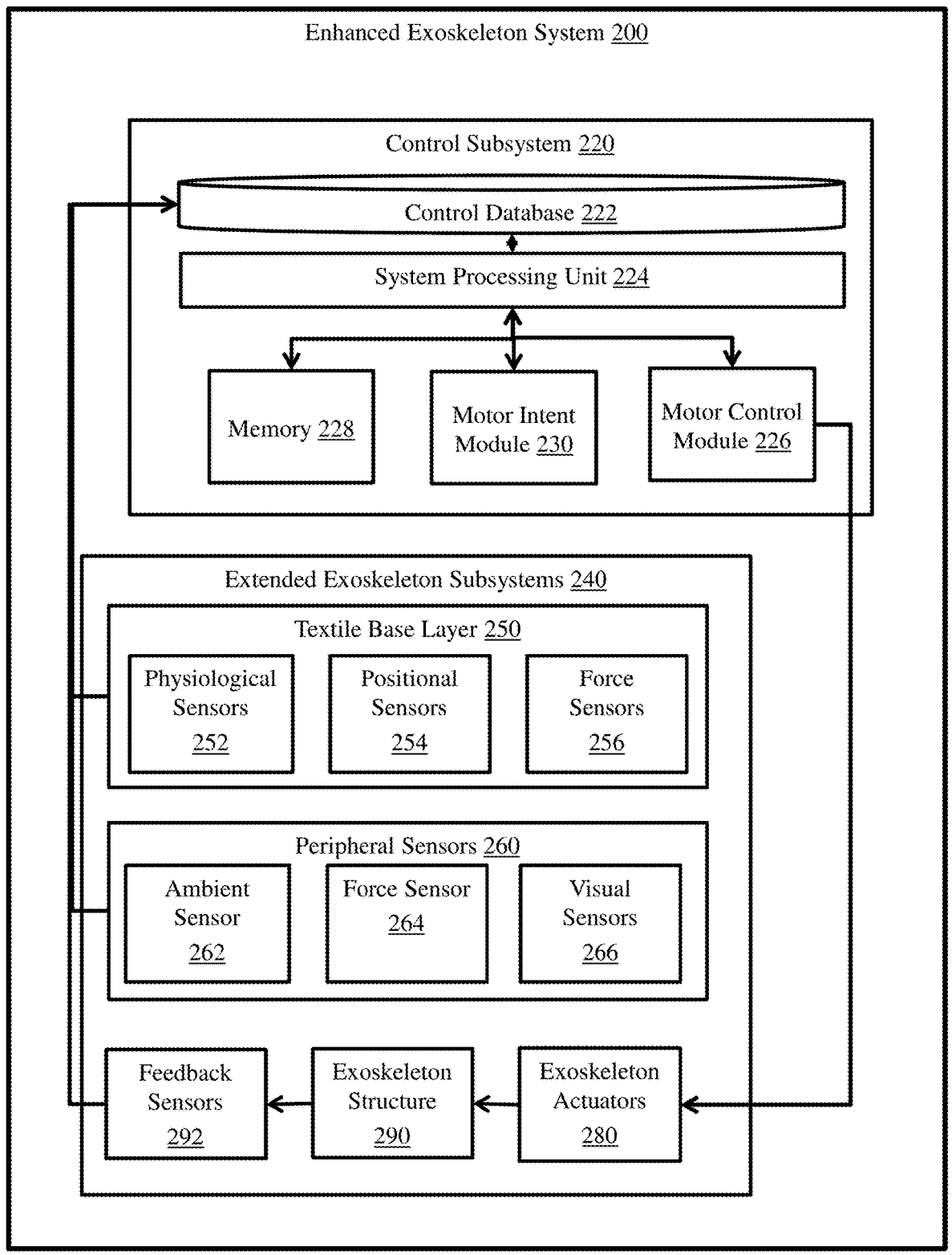
FIG. 2A illustrates a functional system diagram of one example embodiment of an enhanced exoskeleton system.

For illustration purposes and not for limitation, one embodiment of the enhanced exoskeleton system is shown in FIG. 2A. As shown in FIG. 2A, the enhanced exoskeleton system 200 generally comprises a control subsystem 220 and extended exoskeleton subsystems 240. The extended exoskeleton subsystems 240 comprise a sensor-embedded textile base layer 250, peripheral environmental sensors 260 and electromechanical exoskeleton actuators 280 for enacting the user's intended motions. Together, these components assist with collecting human state data, receiving and computing user motor intent, and relay motor intent instructions to the larger exoskeleton system.

Extended Exoskeleton Subsystems

The textile base layer 250 is worn under the exoskeleton hardware. This textile base layer is embedded with sensors such as, but not limited to EMG, IMU, and FSR sensors to ensure that human state data from the exoskeleton operator is available in real time. These three modalities provide measures for muscle electrical activity, plantar surface contact pressures, and acceleration-orientation data of each body segment of interest, respectively.

The EMG sensors are a type of physiological sensor 252 and are generally placed on the muscle bellies of muscular groups which are typically activated for gross motor movements, such as walking, jumping, lifting an object, and pivoting. For example, EMG placement locations may include the gluteus maximus, biceps femoris, rectus femoris, gastrocnemius, tibialis anterior, erctor spinae, rectus abdominus, soleus, biceps brachii, deltoids, and pectorals.

The IMU sensors are a type of positional sensor 254 and are generally placed alongside the EMG sensors being that these sensors are collocated within a plastic housing. The IMU sensors provide acceleration, gyroscopic, and magnetic information about the movements of the operator. While these IMU sensors are best suited for classification of past or current actions, the data provided can be used as an input layer to predict future joint angles and acceleration, a necessary component for predictive motor control.

Multiple FSR sensors are a type of force sensor 256 and may be placed on the bottom of the foot. For example, in a specific embodiment, one sensor is placed on the heel of the foot (i.e., center of the heel pad), one sensor is placed on the lateral ball of the foot (i.e., lateral metatarsal pad), one sensor is placed on the medial ball of the foot (i.e., medial metatarsal pad), and one sensor is placed on the distal end of the foot (i.e., hallux pad).

Together, these sensors may be housed in a moisture-wicking garment that provides conformity to the user's body, unrestricted motion, and sensor compression for optimal sensor-to-skin connection.

The peripheral environmental sensors 260 provide contextual information related to ambient environmental conditions (e.g., air temperature, humidity), ground force interaction (e.g., terrain identification), and structures in the surrounding environment (e.g., stairs, doorways, buildings). Peripheral sensors may include ambient sensors 262, force sensors 264 and visual sensors 266. The contextual inputs of these sensors and fusion with other available data sources for intent classification and prediction may be included as part of the overall system. These peripheral sensors 260 provide additional data that is used by other components of the system such as the control subsystem 220 and electromechanical devices, such as exoskeleton actuators 280, for enacting the received instructions.

Control Subsystem

Figure 2B:
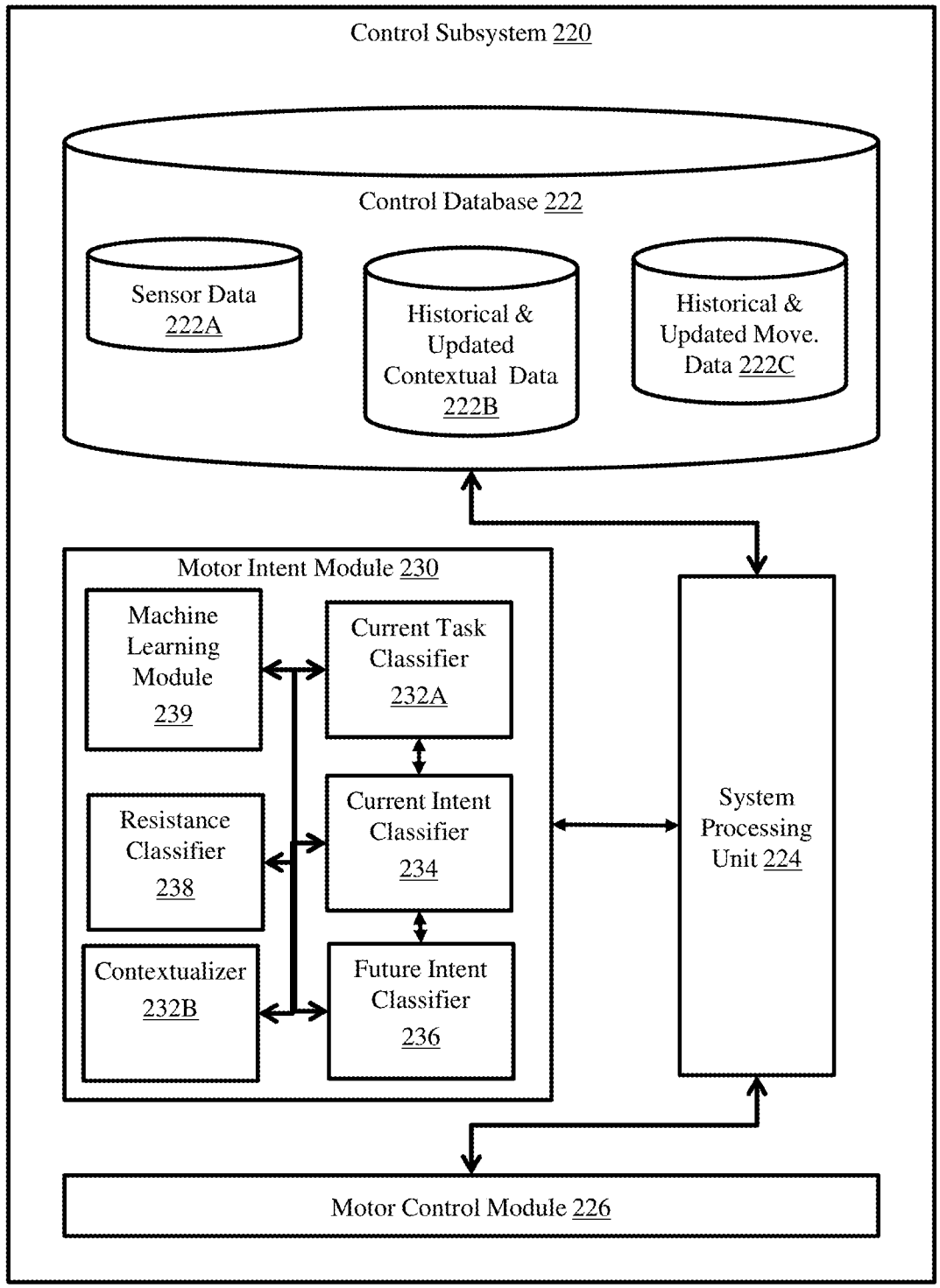
FIG. 2B illustrates a functional system diagram of one example embodiment of control subsystem for an enhanced exoskeleton system.

Referring to FIG. 2B, the enhanced exoskeleton system's on-board central processing unit (CPU) or control subsystem 220, serves as an amalgamation unit where the sensor data is ingested, processed (if additional processing is needed), analyzed to compute motion intent, stored in memory 228, and communicated to the electromechanical devices used to enact the computed motion of the exoskeleton structure 290. The control subsystem 220 generally comprises a control database 222, a motor intent module 230, a system processing unit 224 and a motor control module 226. The control database stores sensor data 222A from system sensors, historical and updated contextual data 222B and historical and updated movement data 222C. The system processing unit 224 communicates information among the components of the control subsystem 220.

The motor intent module 230 performs the classification of sensor data 222A to provide instructions for actuators to support the future intent of the user. The general concept of the motor intent module is to receive data from sensors which is classified against a historical movement library of known movement patterns to determine the current activity or movement of the user to determine the current movement intent of the user. With the current intent determined, this may be used to predict a future movement intent of the user. The intentions of the user may then be used as output to a motor control unit to communicate commands to actuators to support the future movement intent of the user.

The classifiers within the motor intent module 230 may utilize any method of classifying sensor data to determine tasks, intents or predictions of future intents. This classification may be performed using any type of mathematical model including, but not limited to neural networks, decision trees, support vector machines, regression, random forest and autoregression models to classify sensor data against a library of data and/or patterns. For example and not for limitation, the pattern recognition methods may include the use of algorithms that perform probabilistic pattern recognition, feature selection and feature extraction. The library of data may include data gathered through techniques such as supervised learning, unsupervised learning or semi-supervised learning.

In an example embodiment of this concept, the motor intent module 230 may include a current task classifier 232A, a current intent classifier 234 and a future intent classifier 236.

The current intent classifier 234 classifies the sensor data against the historical movement data 222C to determine the current movement intent of the user. For example, if the sensor data shows that the wearer is upright, the wearer is walking and the sensors are signaling to similarly move a leg forward, the current movement intent of the wearer may be classified as they are walking.

In one embodiment, current movement intent classification may be completed via a K-NN algorithm with a custom distance function for an exoskeleton use case. In this example, the classifier ingests the aforementioned fused data and uses the K-NN to compute a subset of intended gross motor actions, such as walking, pivoting, running, crouching, kneeling, and backpedaling. The current movement intent is classified to help probabilistically determine the intended future movement of the user.

The future intent classifier 236 predicts the future movement intent of the user. For example, if the sensor data shows that the wearer is upright but with a trend of leaning forward with no slow in pace, the wearer is walking but the trend is an increase pace, and the sensors are signaling a continuing increased force to move the leg forward, the future movement intent may be classified as an increased walking pace to a jogging pace.

In one embodiment, the future intent classifier 236 utilizes a linear model to predict future sensor information. In some embodiments, the future movement intent classification may be determined by probabilistically matching the current movement intent against a historical movement library 222C of known future movements to determine the predicted/intended movement of the user. Like the current intent classifier, this classification may be completed using the K-NN algorithm.

The motor intent module 230 may also include a resistance classifier 238 to receive sensor data related to the user's resistance to actuated moves by the exoskeleton system. The resistance data may be provided by resistance sensors (see feedback sensors 292 of FIG. 2A). This resistance data is used as data to feed the machine-learning module 239 to improve data such as the contextual data 222B and the movement data 222C. For example, if a wearer has a leg movement pattern from an earlier training of system, but after a period of use of the exoskeleton, the wearer becomes tired and shortens up their stride, a resistance classifier may recognize this and the leg movement pattern may be modified to account for the wearer getting tired over a time period.

In some embodiments, the motor intent module 230 may also include a contextualizer 232B that uses historical contextual data 222B to provide additional contextual information to help classify the user's current task, current movement intent or future movement intent. Similar to the task classification, contextual data may be used to reduce the universe of current and future intents of the user. For example, environmental sensors may identify the environment as submerged in water. In this situation, the actuation of actuator may be increased to overcome the additional resistance force created by the surrounding water. The environmental sensors may also be able to sense features such as uneven terrain which may impact actuation such as foot placement while the exoskeleton is moving.

In some embodiments, a current task classifier module 232A may be provided to classify the sensor data 22A to determine a current task of the user. This task classification may reduce the universe of current and future intents of the user. For example, if the pattern of the wearer has been a walking movement, the current task classifier may classify the task as walking. This may exclude other tasks and predicted movements for the system such as may be associated with tasks such as swimming or doing pull-ups.

With the predicted future intent of the user, the motor intent module 230 communicates a command to the motor control module 226 to actuate components of the exoskeleton. The motor control module 226 communicates the commands, such as motor control movements, needed to reflect the predicted movements from the future intent classifier 236. For example, if it is predicted that the future intent of the wearer is to move a leg forward, a command is communicated to the exoskeleton actuators, like a tendon, to help create that movement of the exoskeleton.

Referring to FIG. 2A, within the control subsystem 220, the system processing unit 224 and associated processes are preferably completed in a time that does not lead to significant controller delay (i.e., lag time) between input from the operator and environment to exoskeleton movement. This time has been operationally and empirically defined to be somewhere between 100-200 milliseconds. A delay between 200-300 milliseconds has been clinically recognized as the maximum tolerable delay for prosthesis or exoskeleton use. This delay is not surprising, as it corresponds with normal human reaction time. As such, the aforementioned subroutines that need to be executed are constrained by a processing time that is not to exceed 200 milliseconds.

The electromechanical actuator devices 280 for enacting the user's intended motions receive electronic instructions from the control subsystem 220 and convert them—via transducer—to mechanical actions based on the user's desired intent. Some examples of suitable transducers include actuators, load cells (e.g., strain gauges), potentiometers, pneumatics, or hydraulics.

In summary, components of an example enhanced exoskeleton system may include: (1) a mechanism for collecting anticipatory motor intent data values via EMG and FSR and body kinematics via IMU from a textile base layer; (2) contextualized data inputs via environmental considerations (e.g., obstacles in the environment, ambient conditions) provided by peripheral sensors; (3) an on-board control subsystem for assessing the provided inputs along with calculating and predicting movement intent; and (4) a network of electromechanical systems within extended exoskeleton subsystems for receiving and enacting the motor actions via on-board actuators. These subcomponents work in a recursive pattern to provide an active exoskeleton with a continual stream of instructions depicting the wearer's desired motion intent.

Another Example Embodiment of the Enhanced Exoskeleton System:

As will be readily apparent to those skilled in the art, components of an enhanced exoskeleton systems and methods of use can be embodied in hardware, software, or a combination of hardware and software. For example, a computer system or server system, or other computer implemented apparatus combining hardware and software adapted for carrying out some of the methods described herein, may be suitable. In some embodiments, the control subsystem may be embodied in hardware, software, or a combination of hardware and software. One embodiment of such a combination of hardware and software could be a computer system with a computer program that, when loaded and executed, carries out a portion of the methods described herein. In some embodiments, a specific use computer, containing specialized hardware or computer programming for carrying out one or more of the instructions of the computer program, may be utilized. In some embodiments, the computer system may comprise a device such as, but not limited to a digital phone, cellular phone, laptop computer, desktop computer, digital assistant, server or server/client system.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

Figure 4:
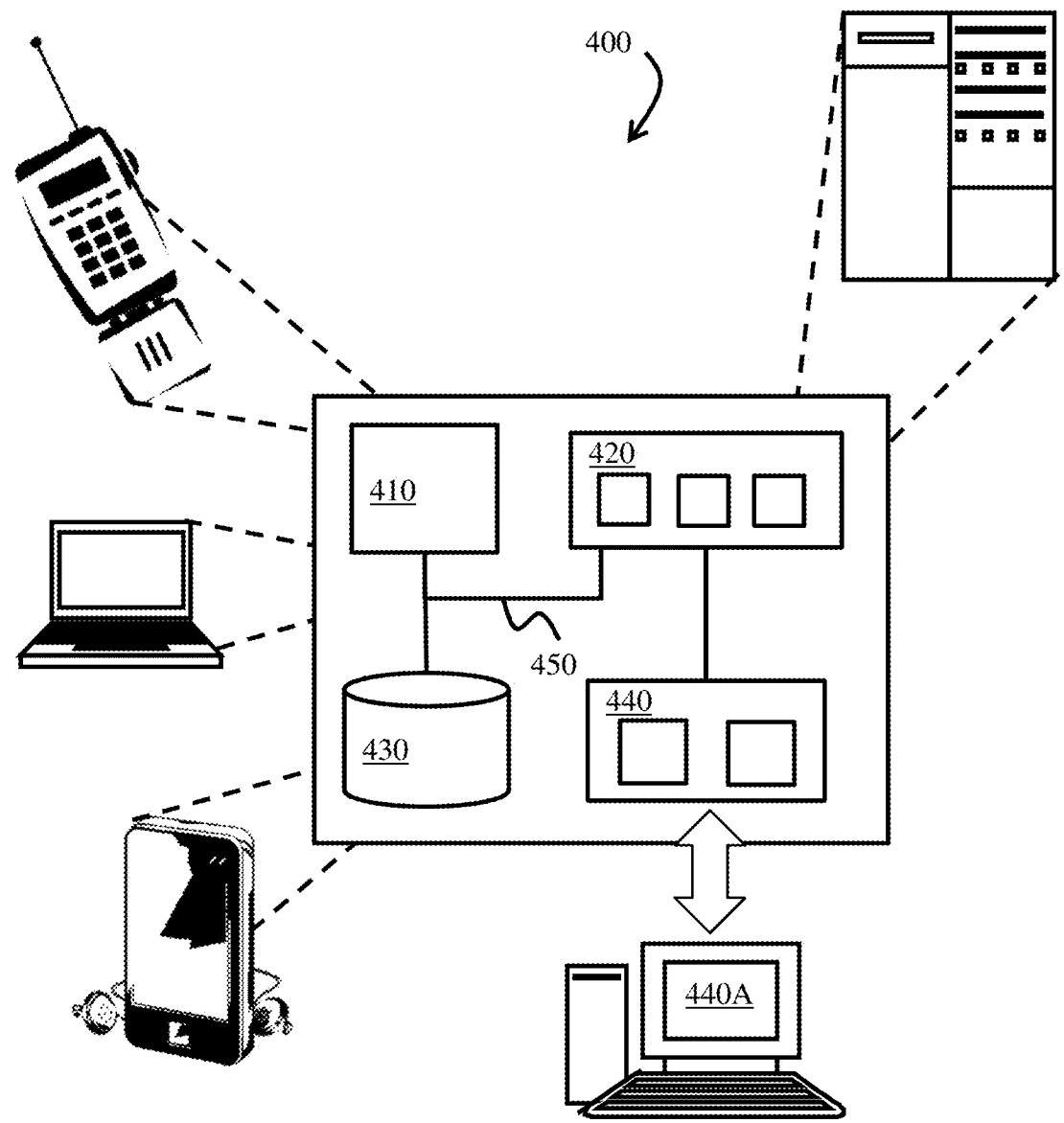
FIG. 4 illustrates one example embodiment of a computer system suitable for a control subsystem.

FIG. 4 is a schematic diagram of one embodiment of a computer system 400 by which the methods may be carried out. The computer system 400 can be used for the operations described in association with any of the computer implemented methods described herein. The computer system 400 includes at least one processor 410, a memory 420 and an input/output device 440. Each of the components 410, 420, and 440 are operably coupled or interconnected using a system bus 450. The computer system 400 may further comprise a storage device 430 operably coupled or interconnected with the system bus 450.

The processor 410 is capable of receiving the instructions and/or data and processing the instructions of a computer program for execution within the computer system 400. In some embodiments, the processor 410 is a single-threaded processor. In some embodiments, the processor 410 is a multi-threaded processor. The processor 410 is capable of processing instructions of a computer stored in the memory 420 or on the storage device 430 to communicate information to the input/output device 440. Suitable processors for the execution of the computer program instruction include, by way of example, both general and special purpose microprocessors, and a sole processor or one of multiple processors of any kind of computer.

The memory 420 stores information within the computer system 400. Memory 420 may comprise a magnetic disk such as an internal hard disk or removable disk; a magneto-optical disk; an optical disk; or a semiconductor memory device such as PROM, EPROM, EEPROM or a flash memory device. In some embodiments, the memory 420 comprises a transitory or non-transitory computer readable medium. In some embodiments, the memory 420 is a volatile memory unit. In another embodiments, the memory 420 is a non-volatile memory unit.

The processor 410 and the memory 420 can be supplemented by, or incorporated in, ASICs (application-specific integrated circuits).

The storage device 430 may be capable of providing mass storage for the system 400. In various embodiments, the storage device 430 may be, for example only and not for limitation, a computer readable medium such as a floppy disk, a hard disk, an optical disk, a tape device, CD-ROM and DVD-ROM disks, alone or with a device to read the computer readable medium, or any other means known to the skilled artisan for providing the computer program to the computer system for execution thereby. In some embodiments, the storage device 430 comprises a transitory or non-transitory computer readable medium.

In some embodiments, the memory 420 and/or the storage device 430 may be located on a remote system such as a server system, coupled to the processor 410 via a network interface, such as an Ethernet interface.

The input/output device 440 provides input/output operations for the system 400 and may be in communication with a user interface 440A as shown. In one embodiment, the input/output device 440 includes a keyboard and/or pointing device. In some embodiments, the input/output device 440 includes a display unit for displaying graphical user interfaces or the input/output device 440 may comprise a touchscreen. In some embodiments, the user interface 440A comprises devices such as, but not limited to a keyboard, pointing device, display device or a touchscreen that provides a user with the ability to communicate with the input/output device 440.

The computer system 400 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet.

One example embodiment of the components of the enhanced exoskeleton systems and methods may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

Figure 3A:
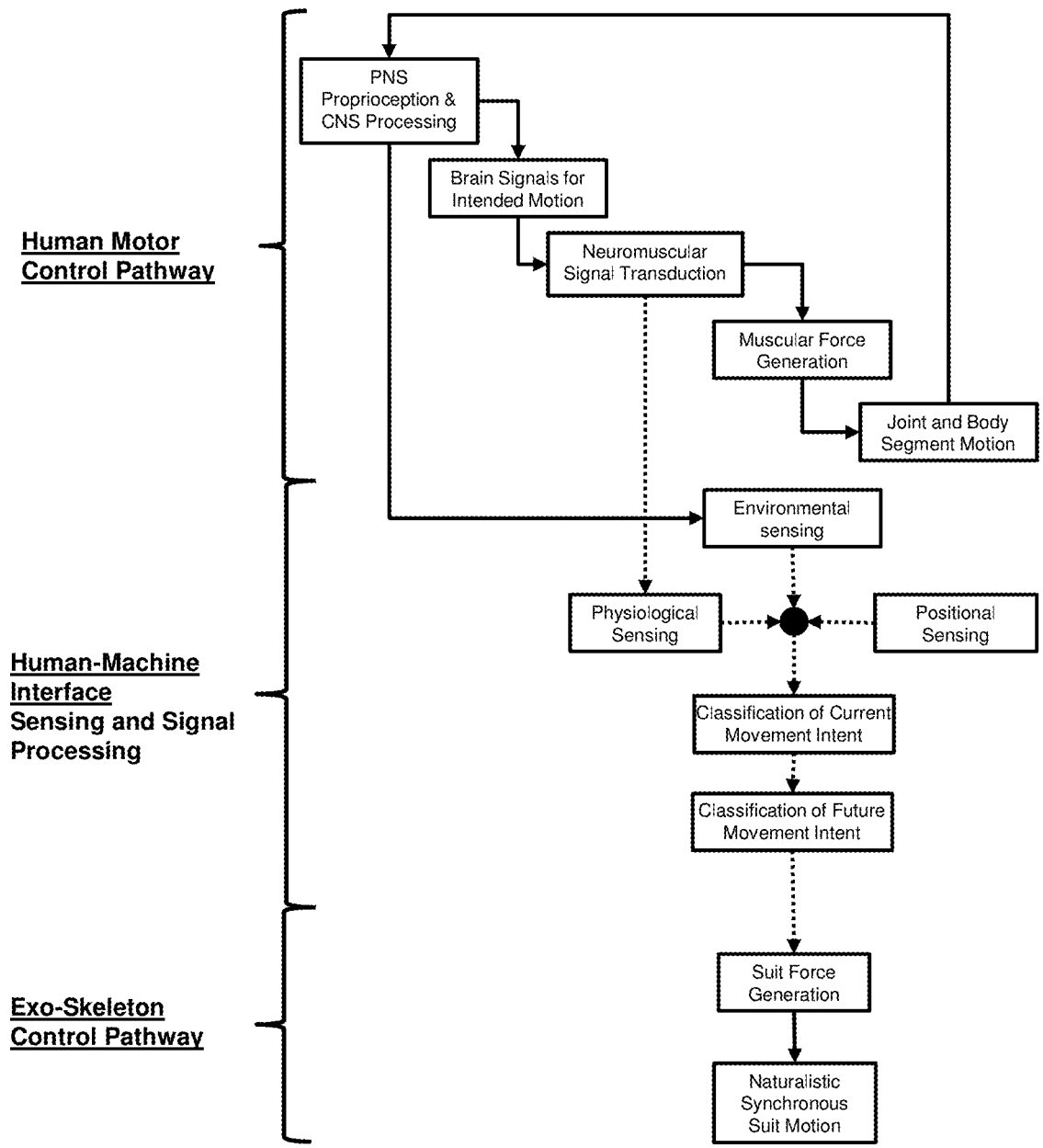
FIG. 3A illustrates a system overview of one example embodiment of an enhanced exoskeleton system.

One Example Embodiment of Methods to Use the Enhanced Exoskeleton System:

The use of the enhanced exoskeleton system described herein attempts to mimic and extend the physiological and anatomical processes involved in human motion to that of an actuated exoskeleton system. As such, FIG. 3A depicts the physiological and anatomical processes that a human body must execute for coordinated motor movement. First, the nervous system—which is composed of the central and peripheral subsystems—provides proprioceptive information and processing of said information from the visual system, vestibular system, auditory system, and general proprioception as we interact with the world around us. The brain then interprets these data sources almost instantaneously and sends along detailed instructions for motion (i.e., motion intent).

More specifically, this process is achieved through rapid communication of three different neurons: (1) sensory neurons, (2) interneurons, and (3) motor neurons. These electrical signals are thus transferred by the aforementioned neurons to the intended muscle groups: a process which referred to as neuromuscular signal transduction. These motor neurons and nerve fibers then cause specific muscle fibers to fire, which ultimately leads to the contraction or elongation of muscle motor units and the larger skeletal muscle as a whole. The contraction or elongation of a muscle then produces movement of specific muscle groups and allow for joint and body segment motion. Once this motion intent has been enacted via the muscular system, the process then continuously iterates in rapid succession until the desired motions have been completed and the central nervous system stops sending intent instructions. Generally, this process is contained with the somatic nervous system (as opposed to the autonomic nervous system), as it involves conscious thought for deliberate movement.

FIG. 3A—as alluded to by the dotted directional arrows—shows that it is possible to use sensors to provide insight into the underlying physiological and anatomical processes.

Figure 3B:
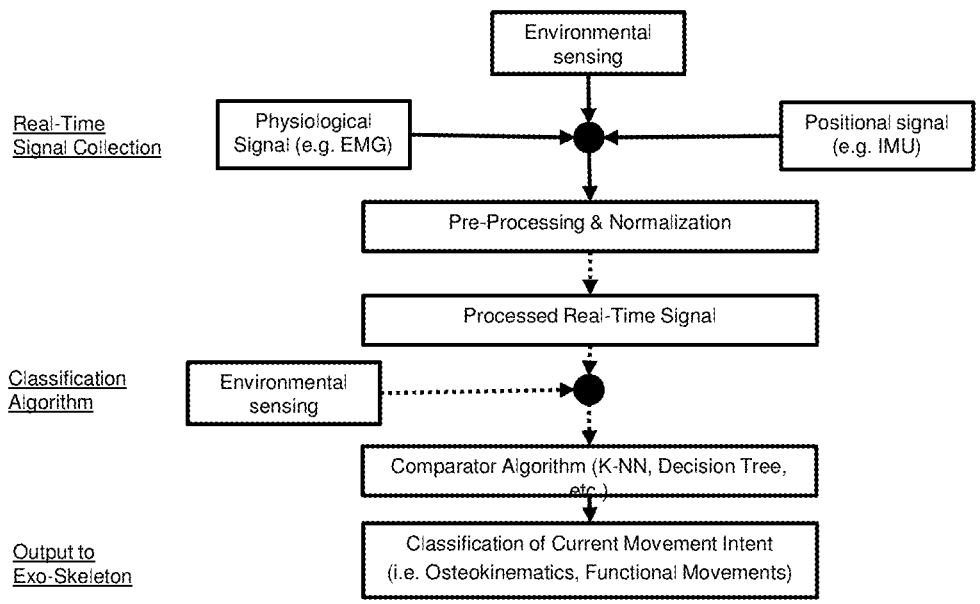
FIG. 3B illustrates a system overview of one example embodiment of the processes used to classify or compute movement intent.
Figure 3C:
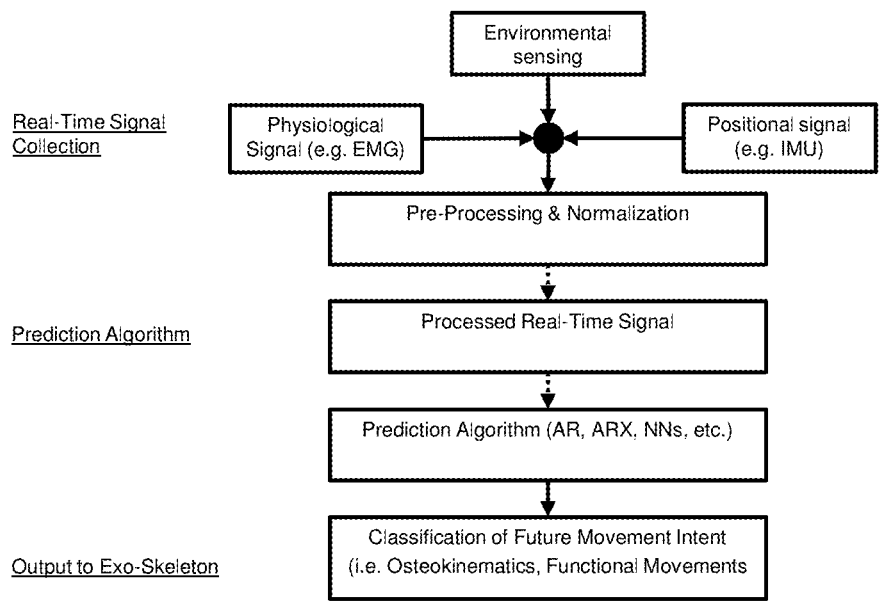
FIG. 3C illustrates a system overview of one example embodiment of the processes used to classify or compute movement prediction.

With this in mind, FIGS. 3B and 3C illustrate how this model of human movement is transposed to an actuated exoskeleton. First, there are three types of data sources: (1) physiological signals that can be recorded throughout the process outline in FIG. 3A; (2) positional data that can be recorded after the motion intent was successfully enacted; and (3) environmental data depicting the conditions of the ambient environment.

Physiological signals that can be helpful in determining motion intent are generally brain activity recorded via EEG, muscle activity recorded EMG, and pressure data recorded via FSR or other transducer-type devices. The order in which these physiological data sources are listed is important, as it mirrors that of the electrical conduction system for movement (i.e., starts in brain, travels to muscles, muscle contract, movement ensues). For the sake of simplicity, brain activity—typically recorded via EEG—provides motor instructions before any movement occurs. EMG data activity provides anticipatory and current status about the intended motion, as there are noticeable increases in EMG activity before a motion is completed. FSR data provides insight once a movement begins to occur, such as how much force the user intends to deliver to the ground (i.e., ground force interaction).

After the motor intent is received and the muscle body begins the desired motion, there are numerous available sensors which can provide positional information. For the system proposed herein, an IMU is referenced for its breadth of available data sources, namely acceleration, gyroscopic, and magnetic data. This data is helpful for characterizing and classifying the user's current action.

Environmental sensors such as thermometers, hygrometers, barometers, goniometers, and cameras provide contextual information about the environment of the user and intended actions that are likely given the present conditions.

As these data streams are being captured in real time, the available data sources are then fused (i.e. time-synced), processed via low-pass filters, and normalized and rectified to clean the data for analysis.

Up until this point, the methods may be similar for classification of current movement intent and prediction of future motion intent; however, the future intent classifier (prediction algorithm in FIG. 3C) may also incorporate previous classifications (such as the current movement intent) as an input for predicting future motion intent. Although described a "future intent classifier", it is understood that this classifier utilizes historical data as input to its classifications and is configured to predict or classify future intentions of the user.

At this point, algorithms, or classifiers, are used to assess the current movement and predict the most likely next movement. The pre-processed data is processed in real-time and communicated for classification.

As shown in FIG. 3B, the real-time signal reflecting pre-processed and normalized sensor data is communicated to the classifier for classification of the current movement intent. Here, the classifier is a comparator algorithm that compares the real-time signals to an existing movement signal database that houses previously collected data for typical human motions (e.g., walking, running, pivoting left or right). For example, a K-NN model with a customer distance function may then be used to determine which predefined action is the most similar to the present action to start identifying the operator's current intent. This K-NN model may then iterate through a decision tree to further refine the classification from a list of candidate actions and to define the most probabilistic action as the operator's current movement intent.

As shown in FIG. 3C, the real-time signal reflecting pre-processed and normalized sensor data is communicated to the classifier for classification of the future movement intent. Here, the classifier is a prediction algorithm that uses the real-time signal to predict a future value of the real-time signal. The current intent classification may also be used by the future intent classifier to classify the most likely next movement of the operator. In some embodiments, the future intent classifier may use machine learning techniques to both classify and predict future time series data with respect to human and exoskeleton joint angles and accelerations. These machine-learning techniques also allow the system to learn user preferences and biomechanical proclivities in some embodiments. Specific machine-learning techniques for this exoskeleton actuation application may include autoregression with exogenous terms (ARX), autoregression (AR), and artificial neural networks (ANN). These machine-learning techniques—as the name would imply—enable for dynamic prediction based on their ability to rapidly learn from historical data sources.

It is worth noting that the classifiers may be configured to only require 50 milliseconds of data to provide accurate classification; thus, this entire process may be run multiple times a second.

After both current and future movement intent are classified, the classifications are communicated to the exoskeleton for enactment based on the classifications. The classified intents are electrically relayed by the motor control module to the exoskeleton's electromechanical devices that enable motion. These devices allow the suit to generate the appropriate forces necessary for the determined functional movements.

The aforementioned process may then be repeated, allowing the system to determine if the user's motion intent has recently changed. In some embodiments, the process is repeated in iterations as rapid as every 50 milliseconds.

For clarity, consider the following example, which depicts the operation of the system in an applied setting.

Imagine wearing the exoskeleton and the associated base layer. You begin to walk forward as witness by the increase in pressure on the ball of your right foot and contraction of the gastrocnemius and peroneus longus. Once the system determines that you are attempting to walk and begins analyzing your gait (e.g., swing phases, heel strikes, typical pressures), it will begin to look for indicators that the user is intended to change the current motion. Let's say the user then has desired to increase their pace to that of jog or run (i.e., the intent to run). The system then looks for physiological and biomechanical indicators of a desired change in motion, such as an increase in pressure on the ball of the foot, increased muscle activity in muscles of thigh and shank, and the presence of a forward lean in the trunk.

The described system would (1) sense the indicators through physiological, environmental, or positional sensors; (2) assess the indicators in real time via the aforementioned machine-learning algorithms; and (3) relay the computed intent to the exoskeleton for enactment.

That rapid iteration of this process allows for minimal lag between detection of motion intent lag and enacted action, thus allowing for naturalistic and synchronous motion between the operator and the exoskeleton.

A second example builds upon the first example of the operation of the system at a macroscopic level.

Imagine that the operator and exoskeleton are synergistically running forward; however, there is an object placed in front of the path of the operator and conjoined exoskeleton. The same three-step process would be executed; however, the situational awareness gained by environmental sensing would be couple with the physiological and positional data sources to fuse computed motion intent with operational constraints. Specifically speaking, the described system could use computer vision insights to determine (1) what the object the object in question actually is (or its characteristics at a minimum) and (2) is a collision forecasted based on current velocities, accelerations or decelerations, and angles of approach. This insight could be paired with physiological data that implies a fast-twitch muscle action is necessary, such as a running jump over the obstacle. Specific examples of physiological indicators of this example would be a large increase in foot pressure and a quick spike in EMG shank activity. And, while positional data extracted from IMUs may not provide much or any predictive capability, it could be useful in classifying and characterizing current movement, which may be an important input into future predictive models.

These examples are clearly non-exhaustive and mainly intended to elucidate the operation of the described system in a real-world environment.

In addition to the provided examples, an example embodiment of the enhanced exoskeleton system in operation incorporates three recursive actions: (1) the fusion of physiological, positional, and environmental information to provide a contextualized estimate of current and future motor intent; (2) the calculation of current and future motor intent in a time window of 200 ms or less; and (3) the relay of computed intent in a machine executable format to the electromechanical components that will enact the intended movement.

Another Example Embodiment of the Enhanced Exoskeleton System:

In one example embodiment of an enhanced exoskeleton system, the system utilizes machine learning algorithms developed using sensors to collect data from an operator not wearing the exoskeleton to understand what the biometric signals look like for different motions in the unencumbered state. Learning these patterns allow actuation of the exoskeleton appropriately once the operator dons the exoskeleton. Through this disclosure, reference numbers refer to the references listed at the end of this disclosure.

The machine learning models supporting this work are broken into two distinct steps that feed into one another. The first step is the classification phase. This phase of the model considers data collected from the operator in the past and identifies which action the operator is most likely performing given a set of known prior actions. The second phase of the machine learning method, the prediction phase, takes the most recent data available from the operator and propagates them forward in time to predict both the action the operator will attempt to make next as well as finer grained accelerations to inform exoskeleton actuation.

The entire classification phase parallels work done by the motor intent module described previously. The current intent classification parallels the work done by the current intent classifier and the prediction phase parallels the work done by the future intent classifier.

These two phases in the machine learning method allow the system to understand what the operator was just doing, and then use that knowledge to make an educated prediction about what he or she will most likely attempt to perform next. Although it is possible that the operator will change actions over time, the inventors believe that this change will be captured as a process and not as an instantaneous shift. For example, if an operator transitions from a run action to a stop action, there will be a transition period in which leaning backwards and slowing will be necessary before movement ceases. This lean will be captured during the classification phase and can be used to predict the intended stopping motion.

This embodiment of the current intent classification component includes a model that uses a measurement of similarity between signals that can be used as the distance measurement within a K-NN classifier. This model has at least two qualities that make it particularly innovative. A first quality is that it captures the features most important to motion classification without the need to conduct post-hoc Fourier or wavelet similarity common for EMG signal classification. Therefore, this method has the ability for classification to occur in as close to real time as possible, therefore avoiding lag between operator intent and operator action, which is critical for exoskeleton activation. A second quality is that this model captures features that are generalizable across days and therefore generalizable to added noise. This is contrary to deep learning methods in which additional noise has been shown to effect neural networks in un-intuitive ways [1].

The above description focuses on the current intent classification component of the aforementioned method to help identify which action the operator is most likely performing. The prediction of an action that are going to happen in the future is helpful because, in some cases, the operator may not be able to perform the action without assistance from an actuated exoskeleton due to the weight of the exoskeleton. The attempt to predict the future is certainly tricky, but it is possible with information from the past along with muscle activations captured with EMG sensors. Every individual's movement profile for a given set of actions is unique, almost like a fingerprint. Like the current intent classification phase, the motor intent module may allow sequences of movements and sensor data to predict the future movement intent of the user. And, like the current intent classifier, the future intent classifier may also learn classifier variables over time to allow sequences of movements and the associated anticipatory signals to refine the future intent (i.e., prediction) classifier. Sensor Information.

To train and develop the classification model, three main data sources are collected from the subject: 1) surface EMG; 2) pressure (via FSRs); and 3) inertial measurement units (IMUs). These three modalities provide measures for muscle electrical activity, plantar surface contact pressures, and acceleration-orientation data of each body segment of interest, respectively.

In one example embodiment, continuous surface EMG (bandwidth 20-450 Hz, collected at 1111 Hz) and motion data were acquired simultaneously and bilaterally using fourteen (14) Delsys Trigno IM sensors that combine pre-amplified EMG electrodes with an inertial measurement unit (IMU; accelerometer [148 Hz], gyroscope [148 Hz], and magnetometer [74 Hz], Delsys Trigno; Delsys Inc., Boston, Mass.). Each sensor contains four silver bar contacts that allow for two differential EMG inputs with two patented stabilizing references. At the locations of sensor placement, the skin was shaved and treated with rubbing alcohol to clean the contact surface. The sensors were then secured directly to the skin using double-sided adhesive tape according to published guidelines [16]-[19].

Figure 5A:
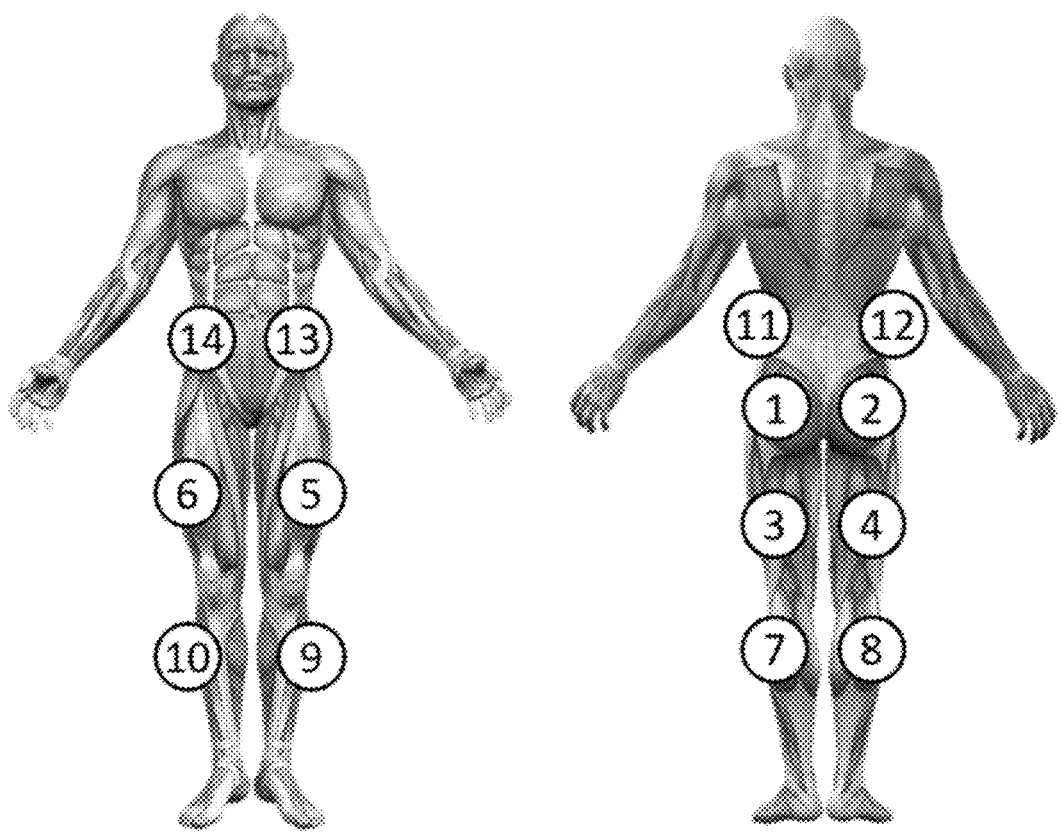
FIG. 5A illustrates the Delsys Trigno sensor placement in an example embodiment of an enhanced activated exoskeleton system.

In this embodiment, the EMG electrodes were placed on the surface of the skin directly above the bellies of the following muscles as shown in FIG. 5A: gluteus maximus (one half the distance between the greater trochanter and the sacral vertebrae at the level of the trochanter on an oblique angle; 1 and 2 in FIG. 5A); biceps femoris (one fifth the distance from the gluteal fold to the bag of the leg; 3 and 4 in FIG. 5A); rectus femoris (one third the distance between the knee and iliac spine; 5 and 6 in FIG. 5A); gastrocnemius (just distal from the knee approximately 1-2 cm medial to the midline; 7 and 8 in FIG. 5A); tibialis anterior (parallel to, and just lateral to the medial shaft of the tibia, at approximately one-third the distance between the knee and ankle; 9 and 10 in FIG. 5A); erector spinae (parallel to the spine approximately 2 cm lateral to the spinous process; 11 and 12 in FIG. 5A); and rectus abdominus (approximately 2 cm lateral to the umbilicus; 13 and 14 in FIG. 5A). These specific sensor locations were selected because they provide muscle activation information associated with the initiation, maintenance, and inhibition phases of the activities described below in the experimental protocol.

Figure 5B:
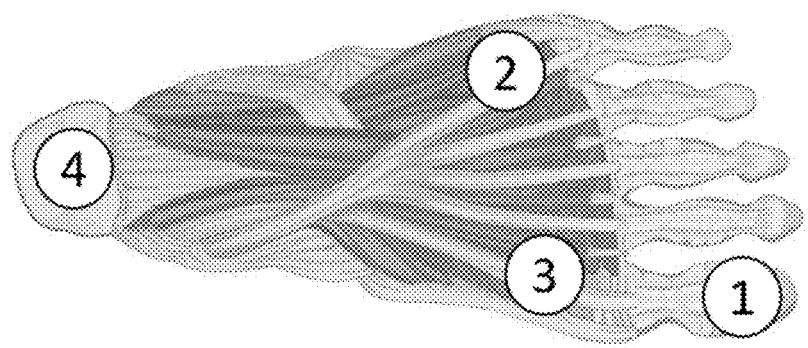
FIG. 5B illustrates the Force-sensitive resistor (FSR) sensor placement in an example embodiment of an enhanced activated exoskeleton system.

In addition to the Delsys Trigno sensors, four (4) Delsys force-sensitive resistor (FSR) sensors (148 Hz) were fixed with transpore tape underneath the soles of each shoe worn by the participant directly below the anatomical locations of the foot as shown in FIG. 5B: hallux pad (1 in FIG. 5B); lateral metatarsal pad (2 in FIG. 5B); medial metatarsal pad (3 in FIG. 5B); center of the heel pad (4 in FIG. 5B). The FSR sensors were utilized for the purpose of providing plantar surface pressure information during performance of each of the tasks.

All raw EMG signals were digitized, for example at 1000 Hz, using the Delsys EMGworks software. Finally, linear interpolation was used on all sensor data (EMG, IMU, FSR) that resulted in time-synced signals at a rate of 2160 Hz before being exported for analysis.

Data Information

To test this embodiment, three subjects were used for all data collections following the same protocol presented below. All subjects presented with no history of lower-limb injury within the previous six months, nor any history of adhesives allergies.

Data collection took place in the Auburn University Biomechanical Engineering (AUBE) Laboratory (32×30 ft) utilizing *Nexus* software (Version 2.6.1) and a Lock+Sync Box (Vicon) to ensure synchronicity of all collected data.

For the sensor-embedded textile EMG testing, a suit was created using an Under Armour compression shirt and pants (Under Armour, Baltimore, Md.). A custom textile-sensor interfacing clip was constructed in Solidworks and 3D printed in polylactic acid (PLA). The clip was designed to allow the Delsys Trigno sensors to attach and detach from the suit to be charged between uses. Surface EMG signals are highly sensitive to the placement of the sensor in relation to the desired muscle. In order to achieve optimal sensor location, the garments were initially put on by Subject #1 (Reference Subject) and the locations of the muscles of interest were marked on the garments. The clips were then sewn into the compression garment at the corresponding markings. This suit was tailored to Subject #1, but used for all other subjects in the study. Therefore, this initial process of locating and marking of the muscles was only done once at the beginning of the data collection process for Subject #1.

For each collection, the subject was asked to put on the sensor embedded textile suit and then a researcher inspected the location of the EMG sensors to ensure that each sensor was at the correct location for the corresponding muscle. Once this initial inspection was complete, there were no other inspections to correct any movement of the sensors during the dynamic trials. Following this, each subject was asked to perform a total of nine tasks, with three trials per task. The tasks performed are listed and described in detail below:

Walking: Subject walked across the laboratory space at a self-selected speed.

Jogging: Subject jogged across the laboratory space at a self-selected speed.

Backwards Walking: Subject walked backwards across the laboratory space at a self-selected speed, performed with "gun" (polyvinyl chloride (PVC) pipe, 2 in. diameter, 36 in. long) held in the "ready to shoot" position.

Gun Walk: Subject walked across the laboratory space at a self-selected speed while carrying a simulated "gun" held in the "ready to shoot" position.

Gun Jog: Subject jogged across the laboratory space at a self-selected speed while carrying a simulated "gun" held in the "ready to shoot" position.

Pivot Left: Subject walked toward the center of the lab space, planted with the left foot, turned to the right and walked to the edge of the lab space, performed with "gun" held in the "ready to shoot" position.

Pivot Right: Subject walked toward the center of the lab space, planted with the right foot, turned to the left and walked to the edge of the lab space, performed with "gun" held in the "ready to shoot" position.

Angled Reversal and Return: Subject walked toward the center of the lab space, planted with the right foot, walked backward three steps at an angle 45° to the initial progression, then walked forward through the center to the edge of the lab space, performed with "gun" held in the "ready to shoot" position.

Walk to Kneel: Subject walked toward the center of the lab space, dropped down into a kneeling position, then rose to continue walking across the lab space, performed with "gun" held in the "ready to shoot" position.

This data-collection process was then repeated on a second day, under similar conditions, in order to evaluate the reproducibility and robustness of the model to variability across days.

Figure 6A:
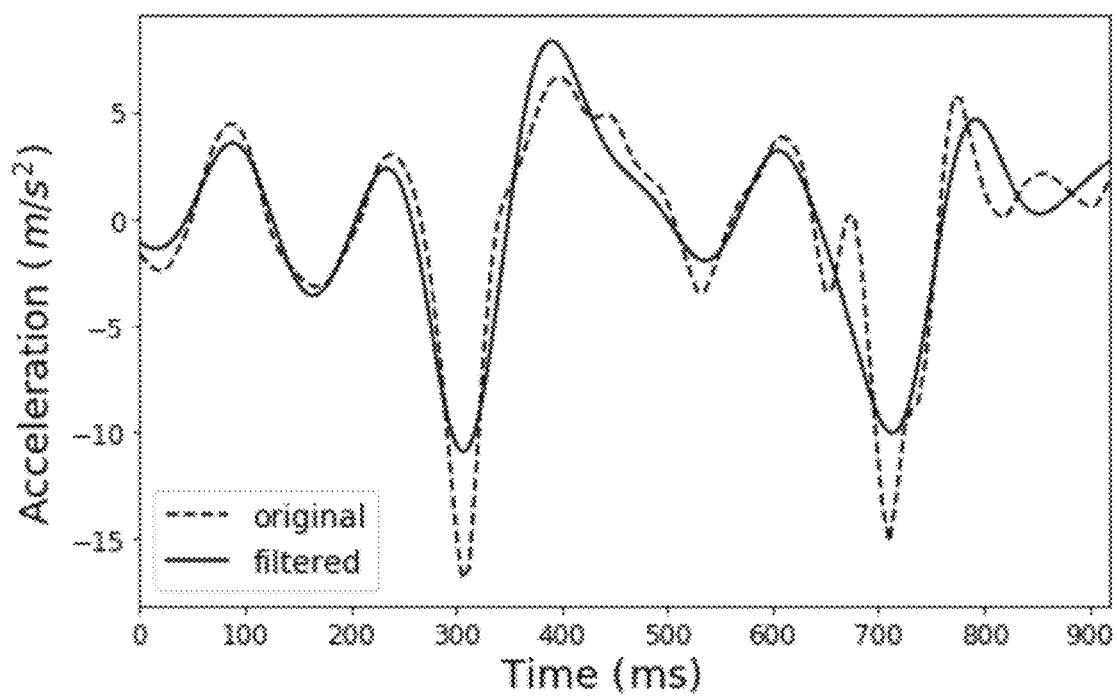
FIG. 6A illustrates an example of an original acceleration signal (dashed) compared to an acceleration signal filtered by a lowpass Butterworth filter (solid) in an example embodiment of an enhanced activated exoskeleton system.

Prior to using the signal data, two steps of pre-processing the data were performed. In order to clean up the IMU sensor data, a lowpass Butterworth filter was used. A lowpass Butterworth filter allows signals below a specified cutoff frequency to pass through it, and attenuates all signals with a frequency above the cutoff. The Butterworth filter rolls off at the cutoff frequency more quickly as higher-order filters are used, thus it was determined that a 5" order filter was appropriate and a cutoff frequency of 10 Hz was used. This filter smoothed out the signal, eliminating all high frequency variability and leaving behind just the general trend of the signal itself (FIG. 6A).

The decision to use a lowpass Butterworth filter was made so that it would be easier to identify the similarities between signals. The noise from high frequency deviations is particularly problematic when viewing signals on such a short timescale, as done here. Without this smoothing technique, most of the high frequency noise in the signal would have been retained, making it more difficult to compare signals using the distance function defined below.

EMG signals provide a measure of the electrical activity of muscles as observed at the skin directly exterior to the target muscle belly. During muscle activation, muscle contractile elements generate and discharge a voltage at frequencies typically between 5 Hz and 255 Hz [20], depending on the type of muscle fiber. Resultant fluctuations in EMG signal can be used to assess the frequency content, and consequently the muscle fiber types, of a muscle contraction. For the purposes of motion classification, the overall signal amplitude is of interest and the signal polarity does not provide additional insight into muscle dynamics in this context. Thus, rectification of the raw EMG signal was used to reduce signal range and facilitate model training.

To achieve the target resolution of motion classification, distinguishing muscle fiber types within a muscle contraction was not necessary. Although it is common to apply a 20 Hz lowpass filter on demeaned and rectified EMG signals [21], it is unknown if this cutoff frequency is appropriate for this context. Therefore, a sensitivity analysis on the effect of EMG lowpass filter cutoff frequency on classification accuracy was conducted. Reference EMG data and real-time 50-ms test segments were lowpass filtered at 5 Hz cutoff frequency increments from 10 Hz to 110 Hz. Finer resolution frequency increments (1 Hz) were considered for frequency ranges of interest. Classification algorithm accuracy was evaluated on each cutoff frequency data set to assess algorithm sensitivity and an optimal lowpass cutoff frequency of 15 Hz was found. More detailed results of that analysis are presented in Section V.

Finally, each signal was normalized using the average value (for that sensor) of the "walking" trial from that specific data collection. Since EMG, IMU, and Pressure signals across participants and days can be highly variable due to physiological differences, the mean average rectified value of each signal during the three walking trials for each participant was used to normalize the values for all nine actions. Using the walking EMG data as the method of normalization has been shown effective in comparing inter-subject EMG data [22]. Although these normalization techniques were performed prior to the analysis below, both steps are capable of running in real time without high computational requirements.

Future Intent Classification

Future intent classification may be determined based on probabilistic matching of current fused data against a historical movement library of known movements to determine the future intended activity of the user much like the current intent classified. This classification may also be performed using any type of mathematical model including, but not limited to neural networks, decision trees, support vector machines, regression, random forest and autoregression models.

In this example embodiment, an AutoRegressive with Exogenous terms (ARX) Model is used to predict future locations of different joints on the operator's body. The equation for the ARX model is shown below:

$$y_{t+1} = c + \sum_{i=1}^{p} \varphi_i y_{t-i+1} + \sum_{k=1}^{p+1} \beta_{k-1} u_{t-k+2} + \varepsilon_t \quad \text{(ARX)}$$

The ARX model is a linear model to predict future sensor information and future locations of different joints on the operator's body. In this model, y is the predicted IMU Channel Accelerations, u is the Exogenous EMG Muscle Signals, β and φ are learned parameters of the dynamic system, and c and ε are constants. In the results below, a single IMU acceleration channel (Left Tibialis Anterior) was use as y and a single EMG actuation channel (Left Rectus Femoris) was used as u in the equation above to test the model.

The resulting values from the ARX Model may be used directly as the predicted movement intent of the user and this may be communicated to the motor control module to actuate the exoskeleton. For example, the resulting value alone or, the resulting value alone feed into a model like a kinematics model, may provide the data to actuate the exoskeleton. Additionally, the resulting value from the ARX Model may be used as an additional sensor data value to be combined with other sensor data values and this combined set of data may be classified using the methods similar to the current intent classifier. For example, the ARX Model may provide an additional sensor data value which is combined with other past sensor data values and this set is compared to data in the historical movement database using methods similar to the current intent classification.

The ARX Model may be trained using past observed sensor data information to learn a linear model that will predict future sensor information. In this embodiment, parameters of the ARX model (β and φ) were learned through training data from a known action such as the tasks performed through the data collection process. Then with newly learned parameters, a ~200 ms long section of the unknown action data set (384 data points) can be used to predict out to 50 ms in the future. The prediction window may be kept short to help minimize error predictions.

K-Nearest Neighbor (K-NN) Algorithm

In this embodiment, a K-NN classifier is defined with a custom distance function in order to classify a pattern of sensor data. Generally, a K-NN classifier performs classification on a new point by comparing it to the existing points in the training data via a distance function. By treating the K closest points as votes for their respective classes, new points are classified by whichever classes are closest to them.

Before defining the specifics of the K-NN classifier used for motion classification in detail, the notion of "distance" (or which points are closest) in this context will be defined.

One piece of the classification algorithm is the definition of the distance between two data points, or a collection of signals in this case. This distance is utilized by the classifier to determine how similar two signals are, and ultimately the quality of distance function chosen will determine the quality of the algorithm. The advantage of choosing a custom distance function is the ability to define what signal relationships are most important for the domain of interest. This custom distance function has three distinct advantages not found together in the more commonly used distances. That is, this distance is sensitive to the (1) sign of the signals, (2) scaling of the signals, and (3) magnitude of the signals.

In the following discussion, one 50-ms collection of all sensors is defined as X. Specifically, X is a series of N sensor measurements $$X = \{X^{(1)}, X^{(2)}, \ldots, X^{(N)}\} \quad (1)$$

where each $X^{(i)}$ is a sensor consisting of $m_i$ data points $$X^{(i)} = \{x_1^{(i)}, x_2^{(i)}, \ldots x_{m_i}^{(i)}\} \quad (2)$$

Then define the distance d(X, Y) between two sensor collections X and Y via the following $$d(X, Y) = \sum_{i=1}^{N} \frac{c_i}{A^{(i)}} \left( f_i(X^{(i)}, Y^{(i)}) \right) \quad (3)$$

where $$f_i(X^{(i)}, Y^{(i)}) = \begin{cases} \sum_{j=1}^{m} |x_j^{(i)} - y_j^{(i)}|, & A^{(i)} > \varepsilon^{(i)} \\ 0, & \text{otherwise} \end{cases} \quad (4)$$

with $$A^{(i)} = \sum_{j=1}^{m_i} |x_j^{(i)}| + \sum_{j=1}^{m_i} |y_j^{(i)}| \quad (5)$$

And $c_i$ and $\varepsilon^{(i)}$ are appropriately chosen constants for each sensor.

Informally, this distance function is the sum over all sensors of the $L_1$ distance (or taxicab metric) between each collection at that sensor divided by the sum of the $L_1$ norm of each collection at that sensor as a normalization. The constant $\varepsilon^{(i)}$ is included to avoid similar, "small" signals from producing large distances as shown below. Three particular advantages that are not all found with the more traditionally used $L_2$ norm or cross-correlation distances include: sensitivity to sign, sensitivity to scaling and sensitivity to magnitude.

Figure 6B:
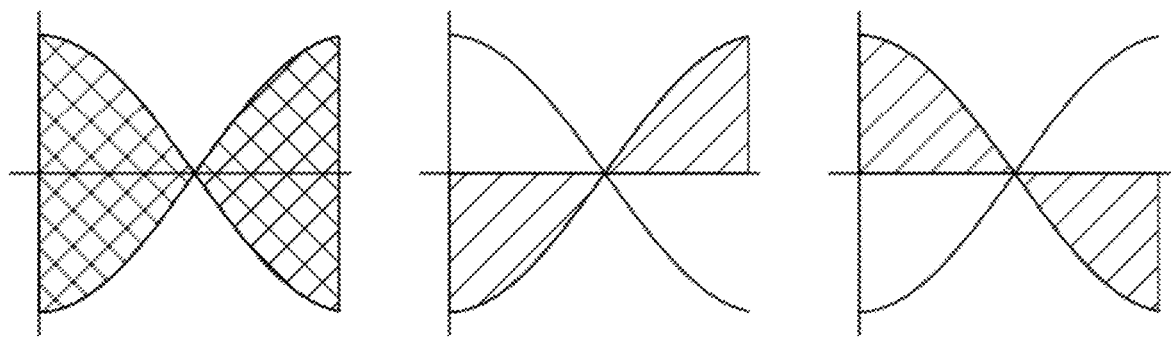
FIG. 6B shows an example of two signals with opposing signs where the distance defined by f is shaded in the left-hand plot, and the components of A(i) are shaded in the middle and right hand plots.

Sensitivity to Sign. Consider two curves with opposing signs. In FIG. 6B, the left plot shows the $L_1$ distance between two signals, given by $f_i(X^{(i)}, Y^{(i)})$, and the center and right show the absolute areas whose sum gives us $A^{(i)}$. Because $x_j^{(i)}$ and $y_j^{(i)}$ have opposite signs for all j, the combined area (left plot) is equal to the sum of the separate areas (center and right plots). This gives us a distance of 1 which maximizes this distance function. This distance places a large significance on the sign of the signals. This is promising as the sign of IMU sensors can be very telling to the type of action/movement occurring. For example, a leg swinging backward is significantly different from a leg swinging forward and this distance will capture that effect when comparing accelerations.

Figure 6C:
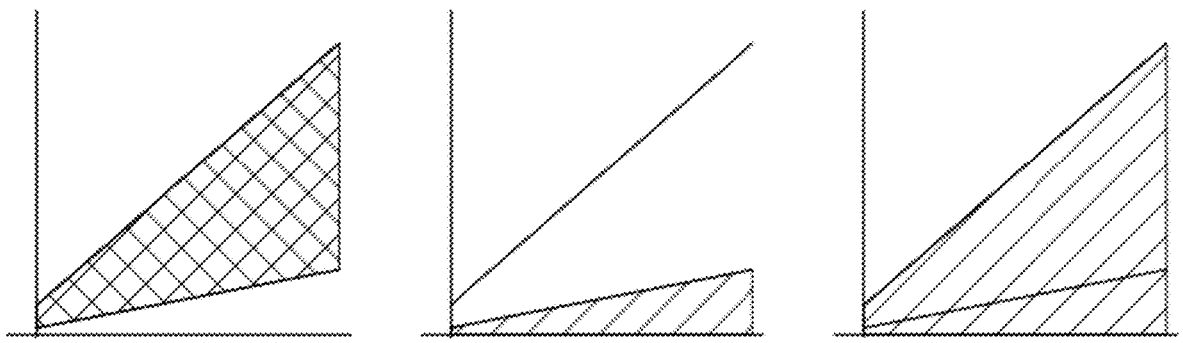
FIG. 6C shows an example of two signals with one a scaled version of the other.

Sensitivity to Scaling. FIG. 6C, shows two signals that are scaled versions of each other but have a clear nonzero distance shown by the positive area in the left plot. This distance will capture the difference between large accelerations due to running and small accelerations due to walking. In particular, for a≠0, we have d(X, aX)>0.

Although this might seem to be an obvious feature, this is not captured in the commonly used normalized cross-correlation distance (XC). Indeed, it can be shown that XC(X, Y)=XC(aX, bY) for all a, b>0.

Figure 6D:
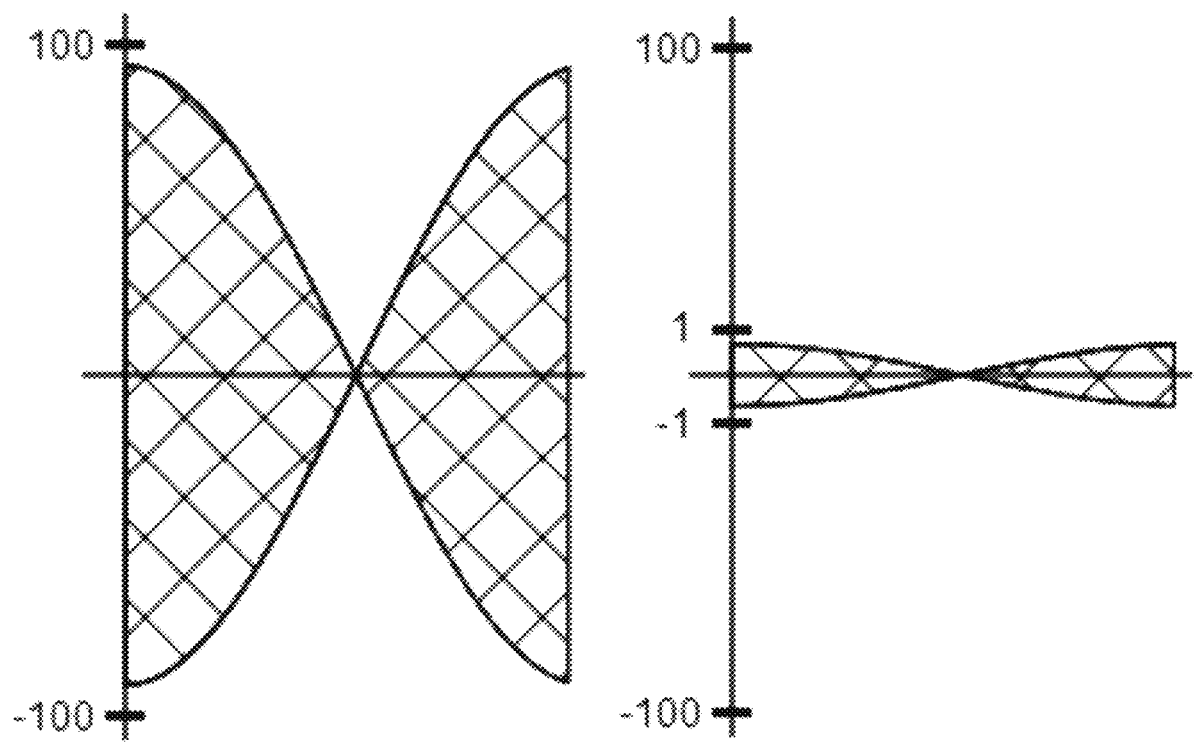
FIG. 6D shows an example of two signals with similar shapes but different orders of magnitude.

Sensitivity to Magnitude. For the last example, consider the following two plots in FIG. 6D. As shown in FIG. 6B, due to the normalization of the distance function and the opposing signs of each signal, the distance between the left two signals is 1 and the distance between the right two signals is also 1. As examples, consider the two cases below.

Case 1. The right-hand signal is always fluctuating between −1 and 1 (e.g., a sensor with minimal acceleration). In this case, the distance should be large because the difference between a signal at 1 and −1 is also significant.

Case 2. The right-hand signal generally fluctuates between 100 and −100, but in this 50-ms window, it happens to be small. In this case, a distance of 1 would not be representative of these signals because the difference between 1 and −1 is not significant and could be attributed to simple noise.

This observation suggests that the constant $\varepsilon^{(i)}$ be included within the definition of $f_i$, equation (4), in order to account for general signal strength for each sensor $X^{(i)}$.

Figure 6E:
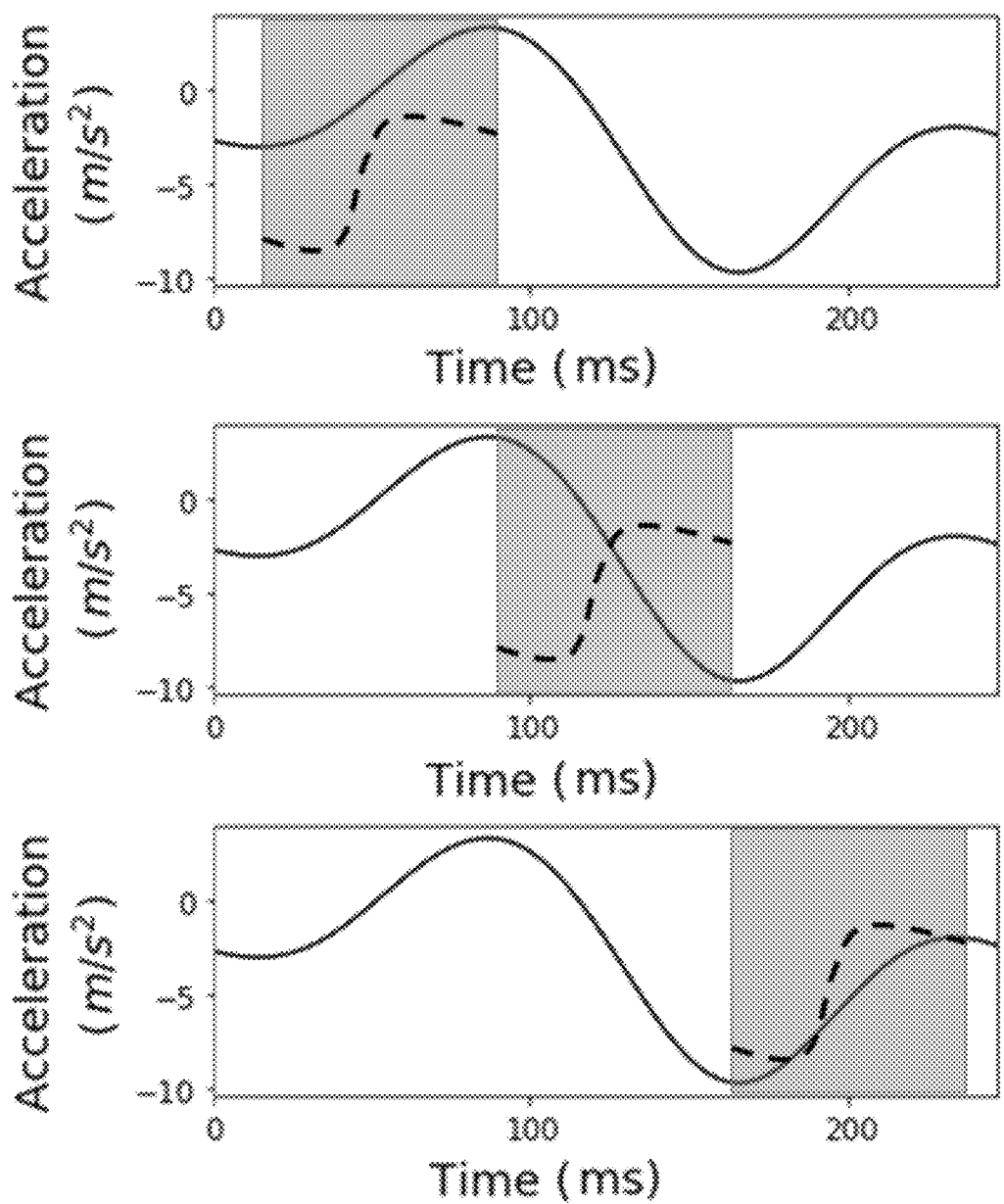
FIG. 6E shows examples of comparing an unknown slice of signal to a known signal using a sliding window to find the best possible match.
Figures 7A, 7B:
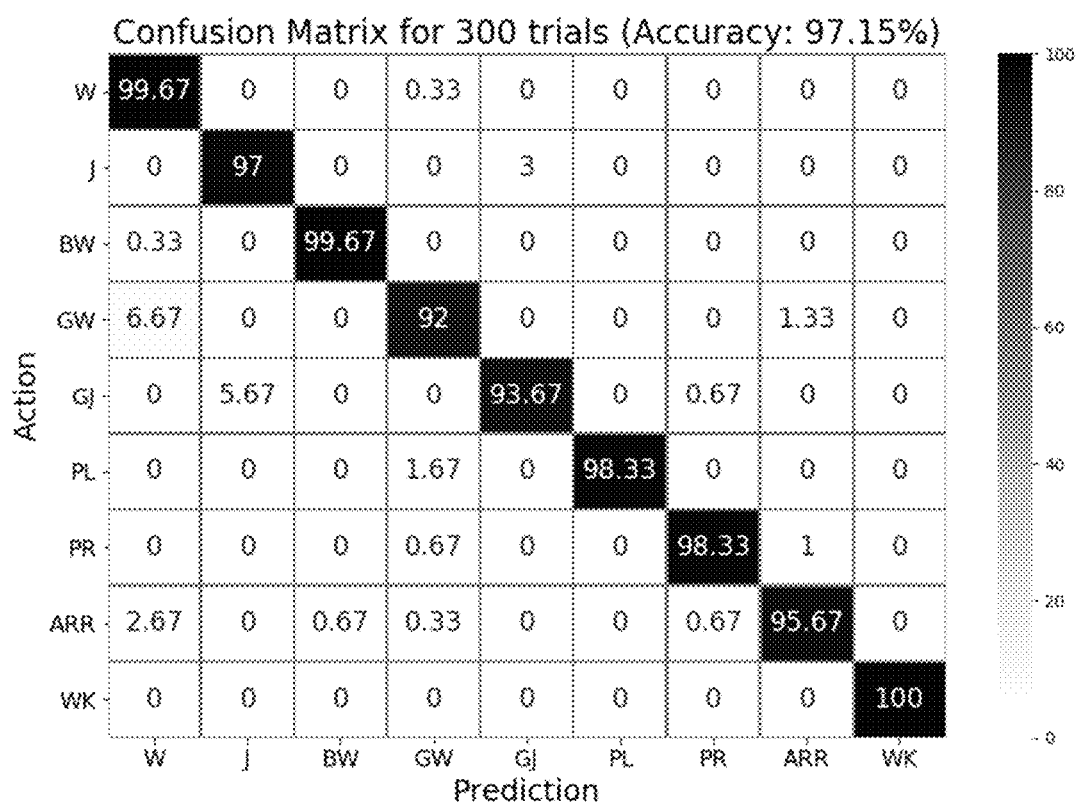
FIG. 7A is a table showing results for data collected on the same day in an experimental embodiment of an enhanced activated exoskeleton system.
FIG. 7B is a confusion matrix for cross validation with IMU, EMG, and pressure data types collected on the same day using the K-NN with custom distance classifier.
Figure 7C:
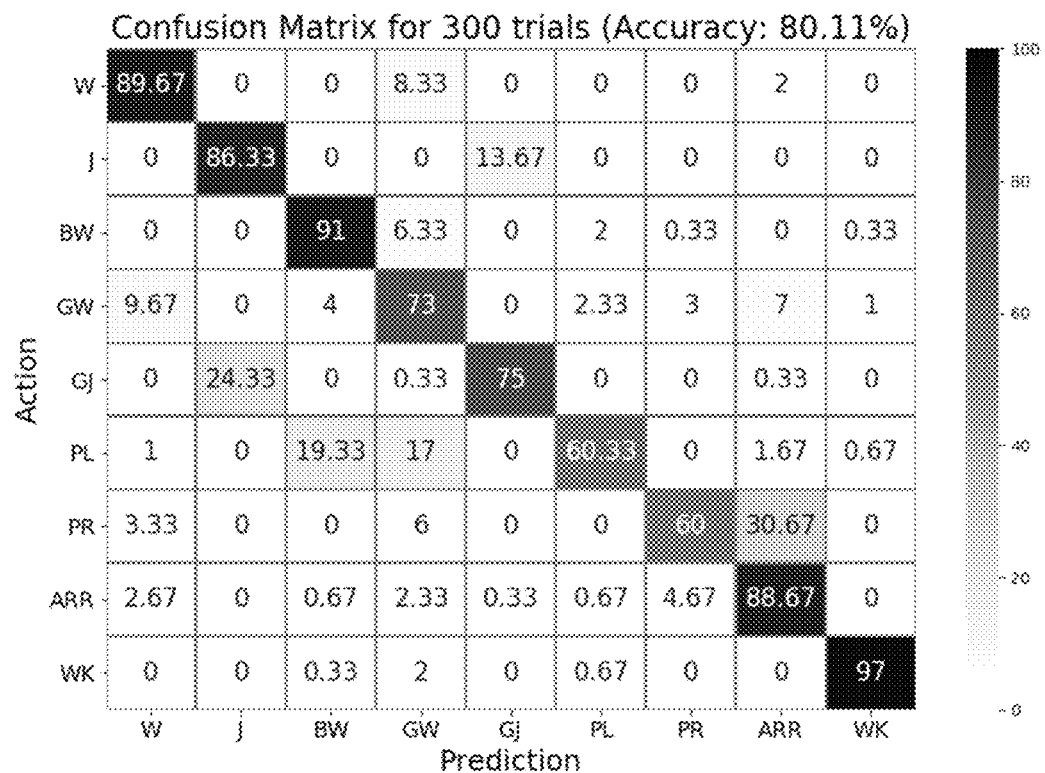
FIG. 7C is a confusion matrix for cross validation with EMG data collected on the same day using the K-NN with custom distance classifier.
Figure 7D:
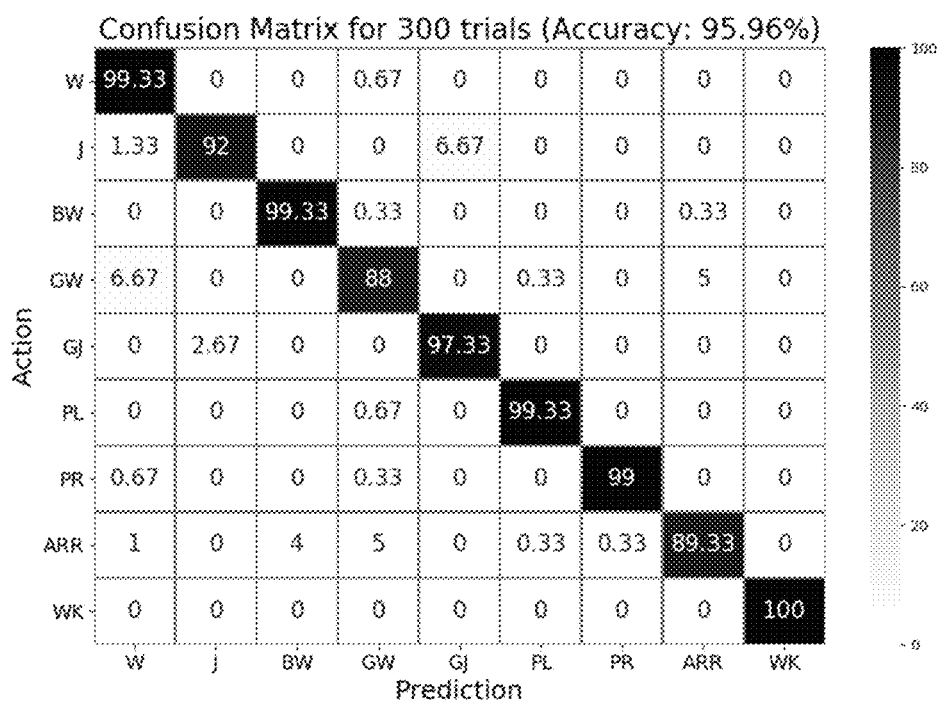
FIG. 7D is a confusion matrix for cross validation with IMU data collected on the same day using the K-NN with custom distance classifier.
Figure 7E:
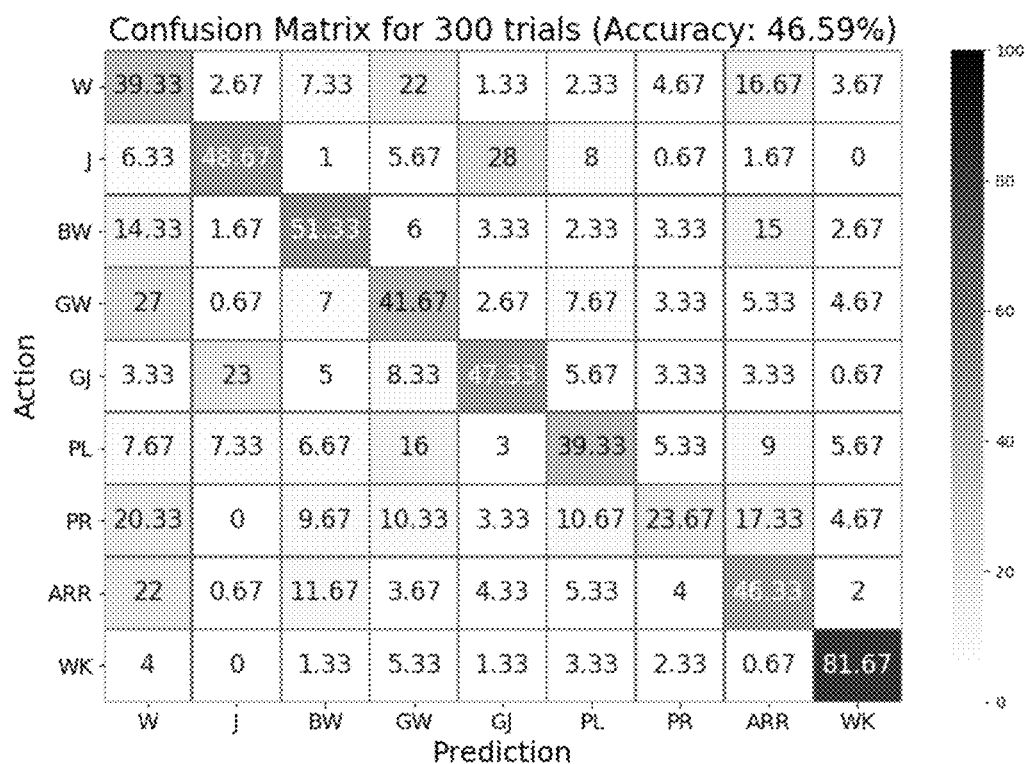
FIG. 7E is a confusion matrix for cross validation with pressure data collected on the same day using the K-NN with custom distance classifier.
Figure 7F:
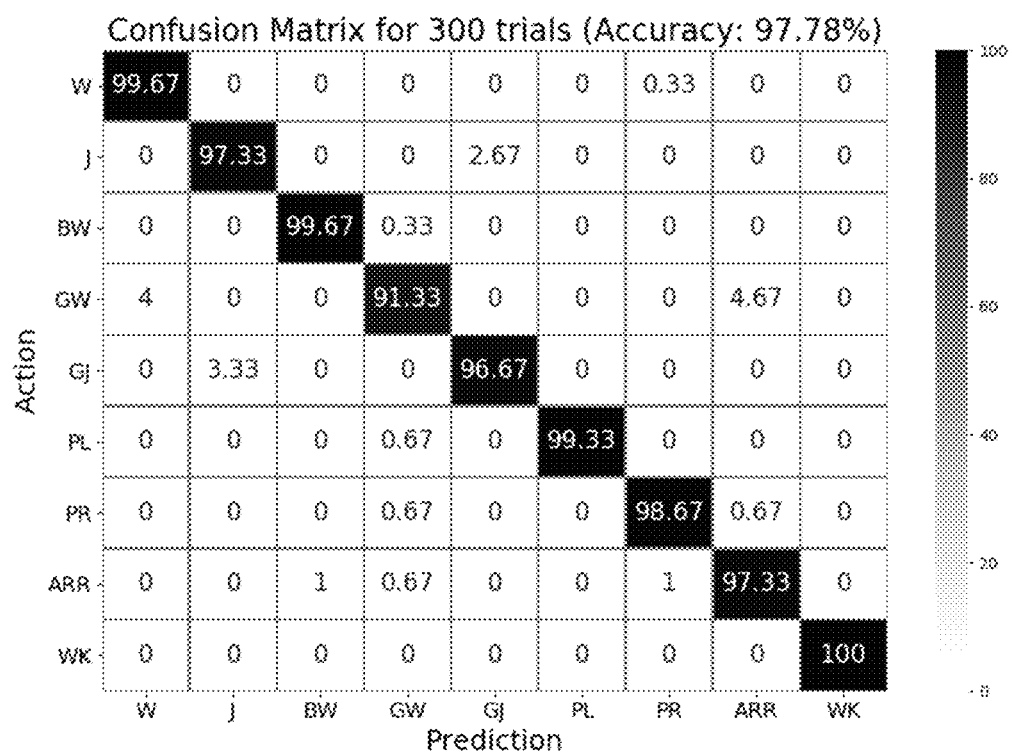
FIG. 7F is a confusion matrix for cross validation with IMU and EMG data collected on the same day using the K-NN with custom distance classifier.

Given this understanding of how two curves are similar, the custom classifier can be defined. Informally, the goal of this classifier is to compare a slice of unknown movement data to each of the known sensor collections and find the closest example of known measurements. For example, given a 50-ms slice of IMU data for an unknown action, that is compared to the entire walking training IMU signal and search out the place that minimizes that distance (FIG. 6E). However, this is done for all sensors simultaneously to find the shift that minimizes the distance of all signals. Then comparing the distance for each action, the most likely action is classified.

Formally, a K-NN classifier is defined with training data consisting of 50-ms slices of data each labeled by their known actions. The distance given above by d(X, Y) gives us a definition of "nearest" in this context. Initial testing has shown that K=10 gives the most promising results. In the following discussion, the methods to define the train and test set as well as present initial accuracy results are described.

Test and Evaluation

Test Protocol. Given the data described above, tests were conducted on a set of nine typical actions used in this domain space: walking (W), jogging (J), backwards walking (BW), gun walk (GW), gun jog (GJ), pivot left (PL), pivot right (PR), angled reversal and return (ARR), and walk to kneel (WK). As mentioned in the experimental protocol, each day the subject performed each action over the course of three trials. Depending on the action, each trial consisted of approximately 1-4 seconds of data. For each test below, the training test consisted of data snippets of length 50-ms extracted within each of the training trials. In order to prevent imbalanced class sizes, 50-ms snippets were extracted at varying interval sizes ranging from every 0.5-ms for the shorter trials to every 7-ms for the longer trials. This gave us sufficient coverage of each trial while also ensuring balanced class sizes. The test samples were then randomly chosen 50-ms segments from each test trial.

As discussed previously, the data were pre-processed using linear interpolation to have all data types at 2160 Hz. However, because some of the sensors fluctuated at a much lower frequency, in particular the pressure and IMU, using all data points at such a high frequency was found to be unnecessary. By reducing the sampling rate, detection of trends within the signals and a reduced processing time can be achieved. This allowed us to sample the FSR pressure data at 40 Hz and sample the IMU data at 80 Hz without sacrificing model accuracy. The unfiltered EMG data contained high frequency components; however, the resulting data were smooth enough to allow for sampling at 40 Hz without a reduction in model accuracy. After this reduction, 50-ms worth of data belongs to a feature space of dimension 380.

Since the goal of this model is to actuate movement derived from the operator's input inside of an exoskeleton, the model needs to be robust to the fact that an operator's movement may be hindered to some extent or even completely by the weight of the exoskeleton. If the exoskeleton cannot easily be moved without actuation, then it is necessary to classify operator intent using only those sensors that do not require movement. Therefore, the classification model was also tested with only EMG signals to determine if movement classification is possible in that scenario. For completeness, evaluations with each sensor type singularly as well as a final evaluation using both EMG and IMU were performed. A series of comparative evaluations of the model using different combinations of data collections were also performed. The first case of training and testing data collected on the same day, although optimal for model accuracy as the data will be most consistent, is not the most realistic scenario as data collection would be required the same day as model use. Therefore, the models were also evaluated when training data and testing data were collected on separate days. Finally, the custom model was compared against three separate models: (1) K-NN with Euclidean Distance: (2) Support Vector Machine (SVM), and (3) An Artificial Neural Network (ANN).

To parameterize each of these models, as well as the custom K-NN model, all parameterization and model-tuning was performed using Subject #1's data. Specifically, for each different sensor type and for each model the following evaluations were performed:

Evaluation of K-NN with custom metric: Model performance was evaluated on the data from subject #1 using 1, 2, 4, 8, and 16 neighbors for both same-day and cross-day evaluations.

Evaluation of K-NN with Euclidean Metric: Using sklearn [23], the KNeighborsClassifier algorithm was trained using the minkowski with p=2 (Euclidean metric). Model performance was evaluated on the data from subject #1 using 1, 2, 4, 8, and 16 neighbors for both same-day and cross-day evaluations. However, the number of neighbors were found to only have a marginal (1%) effect on model accuracy.

Evaluation of Support Vector Machine (SVM): Using sklearn, the SVM algorithm was trained using the radial basis function kernel. Model performance was evaluated on the data from subject #1 using C and γ values of 1/64, 1/4, 1, 4, and 64 for both same-day and cross-day evaluations. However, the number of neighbors were found to only have a marginal (1%) effect on model accuracy. Trained with sklearn using parameters C=1 and $\gamma=2^{-4}$ (parameters chosen as a result of a grid search over C and γ).

Evaluation of an Artificial Neural Network (ANN): Using Keras [24], a sequential model was trained using a categorical cross-entropy loss function, a dropout value of 0.25, a batch size of 32, and 100 epochs. Model performance was evaluated on the data from subject #1 using 2, 3, and 4 sigmoid activation layers of size 64, 256, or 512 and a final softmax layer. While the makeup of the best model type for each sensor combination was different, generally 2 or 3 layers showed the best performance.

Results. When using data collected on the same day to both train and test the classifier, there is no removal of sensors between trials and little change in body state for the operator. This removes much of the signal variability and keeps the signals consistent. As expected, this gives the best results across all classifiers tested. Table I shows a comparison of the custom K-NN algorithm to other well-used machine learning algorithms. For these results, a 3-fold cross validation of each model was performed by using two trials to train and the last as the test set and then repeating for each combination of training sets.

Due to the large dimension of the collections of signal data (in the cases of all sensors or IMU & EMG), a standard SVM has a hard time extracting generalizable hyperplanes to distinguish actions from each other without large amounts of data [25]. The other models performed well on each of the other collections except for pressure where all models have poor results. However, the custom distance performs comparatively in the all sensors case and also extracts suitable enough features on the EMG only and IMU cases resulting in better results overall. For a more in-depth look at the K-NN classifier results observe the confusion matrices (FIGS. 7B-7F) and the respective discussions below.

EMG alone provided a wide range of movement classification accuracy across all tested models, with reduced accuracy through the SVM model (0.30 and 0.59) and peak accuracy through the custom K-NN model (0.81 and 0.80). By leveraging EMG alone, the dimensionality of input data is significantly reduced and SVM results are improved compared to the all sensor case. Though movement is initiated through muscle activation and subsequent muscle contraction, the EMG classification of current movement is not the top performing data stream. Movement classification errors occur primarily by false classification of pivot movements ("pivot right", "pivot left") as gun walk and angled reversal and return. Upon inspection of the EMG signals and resultant kinematics, it becomes evident that the prepositioning required for stabilization of a pivot movement closely resembles the prescribed stance for a "gun walk". In addition, the "angled reversal and return" action suffers from misclassification for the pivot movements and "gun job" and "jog" suffer overlap in their classifications.

IMU alone tended to provide high (0.88) classification accuracy across all tested models, with exception to the SVM model (0.11), and peak performance through the custom K-NN model (0.95 and 0.97). Misclassification is reduced lower in the IMU only case compared to EMG only case. The pairs of gunwalk-walk and gunjogjog are both still prone to confusion due to similar body kinematics, but the frequency of error is reduced.

Pressure alone provided the lowest classification accuracy of the three evaluated data streams (<0.55). Poorest classification accuracy resulted from the custom K-NN model (0.44), while peak performance was found through the Euclidean distance KNN model (0.54). Although plantar surface pressure changes are concurrent with the kinematics sensed through IMUs, the confusion patterns for pressure resemble those of EMG only classification. Pivot, gun-borne, and angled reversal and return movements were often misclassified for each other when relying on pressure only. Since measured on the plantar surface at only 4 major locations, the spatial resolution of pressure on the foot is low, and may be resulting in the observed poor classification performance.

By combining EMG and IMU data streams as input for the classifier models, matched or improved classification accuracy is observed for 3-of-4 models. SVM suffers from increased dimensionality of the combined data set, and exhibits poor classification performance (0.11). For all other model types, slight improvement over the "All Sensors" case is observed, with peak classification accuracy from the custom K-NN model (0.98 and 0.97). Over the 50-ms input window, EMG signals are observed to augment classification accuracy by providing a physiological precursor to the resultant mechanical motion observed directly through the IMU data stream. The combination of EMG and IMU data works synergistically to improve accuracy, but also carries over misclassification characteristics from the component data streams. Misclassification, while with low prevalence, still occurs between pivot, angled reversal and return, and gun-borne movements. Addition signal preprocessing and explicit feature extraction, as opposed to additional data streams, may reduce the occurrence of action misclassification.

Overall, models perform reasonably well in this scenario. In fact, many of the misclassifications are in expected places. The model performs very well on a large number of the most basic actions such as walking, jogging, and backwards walking; however, the performance of the model degrades when considering more complex actions such as angled reversal and return or the pivots. In particular, one of the largest misclassifications is a prediction of backwards walking for the ARR action. At closer inspection this might actually be expected since a portion of the ARR action consists of three steps backwards before a slight pivot and run forward. Similarly, gun walk is a component of both the pivot actions, prior to and after the actual pivot, and so it is no surprise that any model confuses the two actions. Thus, the model may actually be performing as anticipated and classifying the finer-grained movements within these complex actions. However, this scenario of using the same day for training and test is not the case that would be most useful in practice, and is very prone to overfitting for that day's data. Therefore, when training and test data were collected on different days was also considered.

Data Collected Across Days. When using data collected on different days (Table V-C), the removal of sensors and changes in body state for the operator, although small, give enough variability to the signal that the results degrade slightly for the custom classifier. Perhaps more notably, however, the neural network has a significant drop in accuracy. This is suspected to be due to the noise added by crossday variability, which has been shown to affect neural networks in un-intuitive ways.

Figures 8A, 8B:
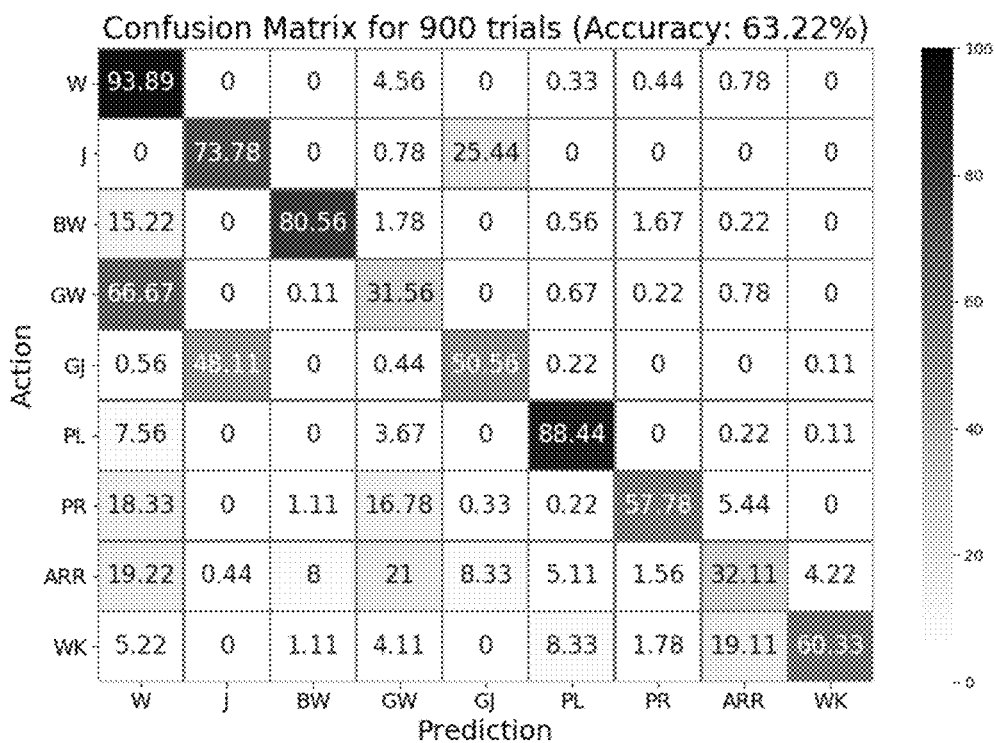
FIG. 8A is a table showing results for data collected on different days in an experimental embodiment of an enhanced activated exoskeleton system.
FIG. 8B is a confusion matrix for cross validation with IMU, EMG, and pressure data types collected across days using the K-NN with custom distance classifier.

As might be expected, the performance of all models decreases when using data across different days. However, the sensitivity of neural networks to noise causes them to behave particularly poorly here, whereas a model trained particularly for this type of sensor network holds up much better to the inter-day variability. The confusion matrix in this case tells a similar story as the same-day results. With all sensors, as shown in FIG. 8A, the mistakes are similar to those before. Gunwalk is frequently classified for other actions such as pivotleft, angled reversal and return, and walk to knell which all contain gunwalk as a subaction.

Figure 8C:
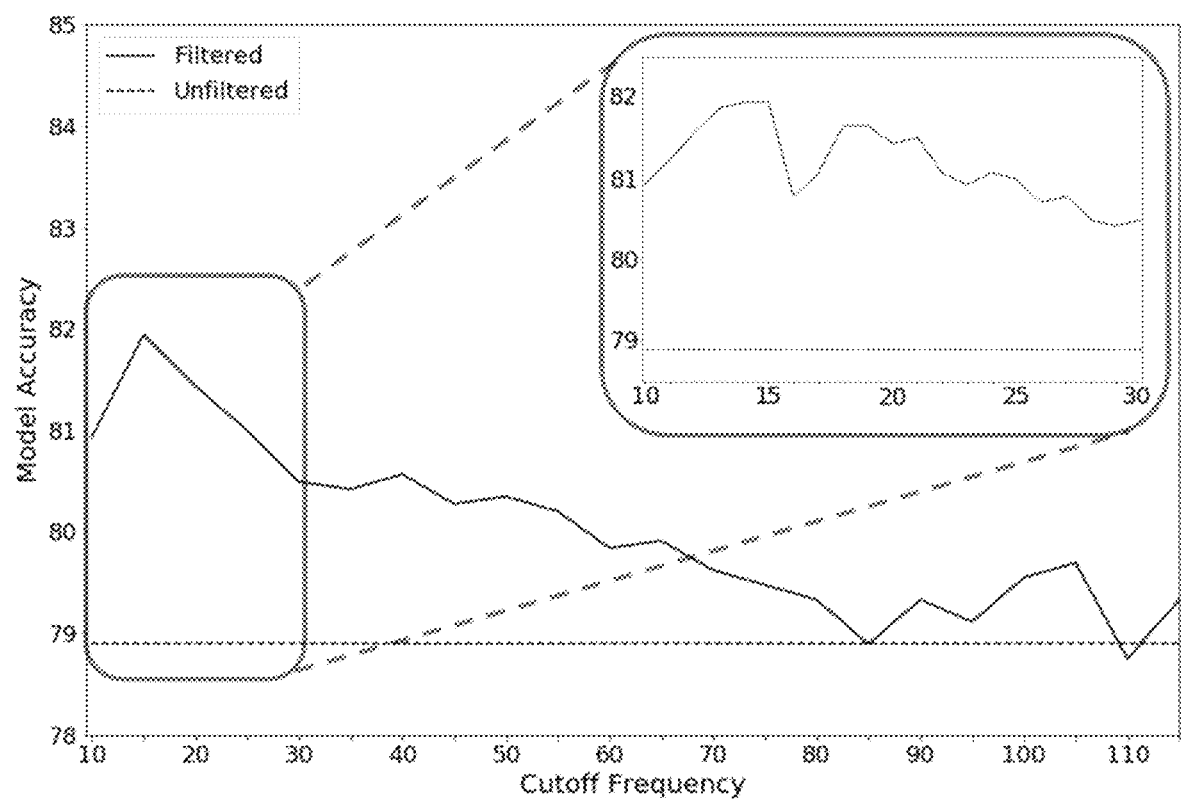
FIG. 8C is a plot of Algorithm classification accuracy across EMG lowpass filter cutoff frequencies where a subplot depicts 1 Hz resolution for refined accuracy assessment over peak classification accuracy range.

Filter Cutoff Analysis. As discussed above, an evaluation of the classification algorithm's sensitivity to EMG filtering frequency was also performed using data from subject #1 to prevent data leak. That analysis indicated that use of a lowpass filter (cutoff frequency 10 Hz-110 Hz) enhanced classification accuracy (FIG. 8C). Use of a 15 Hz lowpass filter cutoff frequency yielded the greatest improvement, increasing classification accuracy by more than 3% over the unfiltered EMG case (FIG. 8C—subplot).

Discussion

Although using this custom distance classifier with a K-NN classifier has shown a significant advantage in terms of accuracy, it does have one drawback in terms of processing time. In order to stay close to the optimal time delay [26]

from signal to controller of 100-ms, the amount of processing time must be cut down to as close to 50-ms as possible.

Unfortunately, a K-NN classifier pushes the majority of its processing to test time, as opposed to training time. Thus, there must be considerations on the amount of training data used or the number of sensors to reduce that testing time. Nevertheless, much of this problem is solved by the decomposability of equation (3), which allows for parallel processing of the algorithm when run in real-time. Although the current implementation of EMG-based algorithm classifies the concurrent signal frame, improved performance may be attained by introducing a dynamic window size for the input EMG frame. For many motions, a window of 20-120 ms will allow time for the input EMG signal to actuate the motion that will be classified. On the other hand, IMUbased classification may benefit from the temporal proximity to the motion being classified. Unlike EMG, IMU signals are generated by the resultant motion of the limbs that, when evaluated, can be used to reconstruct current kinematics of the individual. However, classification of motions in the future will have decreasing accuracy. Finally, because spatial resolution of the pressure sensors is low, improvements to the classification may be attained through sensing along the central center-of pressure line that shifts along the foot from heel to toe over a gait cycle. Although SVM and ANN provide the strongest pressure-based classifier, exploration of multiple data streams for classification will require selection of a core classifier model. Combining data streams (e.g. IMU+EMG) show increased custom K-NN classification accuracy for same-/cross-day data collections.

This method for classifying operator actions utilized biometric and inertial measurement sensors. In addition, by encoding the appropriate signal relationships within a signal distance function, embodiments of the system were able to outperform more common machine learning tools especially when training and testing data were collected on different days. Furthermore, reducing the feature space to include only EMG signals had only a small negative effect on model accuracy.

Since EMG signals are anticipatory by nature (i.e., signal amplitude increases prior to body segment movement), the ability to classify movement with only EMG signals (and particularly without understanding the current operator acceleration), is helpful to the proposed application of exoskeleton actuation. An EMG classification scheme is one step closer to predicting operator intent, i.e., predicting movement before it happens. To take this further, classifying movement at a more micro level (e.g., single range of motion, abduction/adduction) allows us to understand operator intent at a smaller scale that may be helpful to better actuate human-worn exoskeletons.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

REFERENCES

[1] C. Szegedy, W. Zaremba, I. Sutskever, J. Bruna, D. Erhan, I. J. Goodfellow, and R. Fergus, "Intriguing properties of neural networks," CoRR, vol. abs/1312.6199, 2013.

[2] S. Vanrell, D. Milone, and H. Rufiner, "Assessment of homomorphic analysis for human activity recognition from acceleration signals," IEEE J. Biomed. Health Inform, vol. PP, pp. 1-1, July 2017.

[3] Z. He and L. Jin, "Activity recognition from acceleration data based on discrete consine transform and svm," 2009 IEEE Int. Conf. Syst. Man Cybernet, pp. 5041-5044, October 2009.

[4] C. Randell and H. Muller, "Context awareness by analysing accelerometer data," Digest of Papers. Fourth International Symposium on Wearable Computers, pp. 175-176, 2000.

[5] Y. Chen and Y. Xue, "A deep learning approach to human activity recognition based on single accelerometer," 2015 IEEE Int. Conf. Syst., Man Cybernet., pp. 1488-1492, 2015.

[6] C. Catal, S. Tufekci, E. Pirmit, and G. Kocabag, "On the use of ensemble of classifiers for accelerometer-based activity recognition," App. Soft Comput., vol. 46, January 2015.

[7] T. T. Um, V. Babakeshizadeh, and D. Kulic, "Exercise motion classification from large-scale wearable sensor data using convolutional neural networks," CoRR, vol. abs/1610.07031, 2016. [Online]. Available: http://arxiv.org/abs/1610.07031

[8] J. Suto, S. Oniga, C. Lung, and I. Orha, "Comparison of offline and real-time human activity recognition results using machine learning techniques," Neural Comp. App., March 2018.

[9] O. D. Lara and M. A. Labrador, "A mobile platform for real-time human activity recognition," 2012 IEEE Consum. Comm. Network. Conf. (CCNC), pp. 667-671, January 2012.

[10] A. Papoulis, The Fourier Integral and Its Applications, ser. McGraw-Hill electronic science series. McGraw-Hill, 1976. [Online]. Available: https://books.google.com/books?id=2HNhnQEACAAJ

[11] P. Domingos, "A few useful things to know about machine learning," Commun. ACM, vol. 55, no. 10, pp. 78-87, October 2012. [Online]. Available: http://doi.acm.org/10.1145/2347736.2347755

[12] R. X. Gao and R. Yan, From Fourier Transform to Wavelet Transform: A Historical Perspective. Boston, Mass.: Springer US, 2011, pp. 17-32.

[13] B. Ayrulu-Erdem and B. Barshan, "Leg motion classification with artificial neural networks using wavelet-based features of gyroscope signals," Sensors (Basel, Switzerland), vol. 11, pp. 1721-43, December 2011.

[14] A. Phinyomark, C. Limsakul, and P. Phukpattaranont, "Application of wavelet analysis in emg feature extraction for pattern classification," Meas. Sci. Rev., vol. 11, pp. 45-52, June 2011.

[15] M. Arvetti, G. Gini, and M. Folgheraiter, "Classification of emg signals through wavelet analysis and neural networks for controlling an active hand prosthesis," in 2007 IEEE 10th Int. Conf. Rehab. Robotics, June 2007, pp. 531-536.

[16] E. Criswell, "Cram's introduction to surface electromyography, $2^{nd}$ edition," Medicine & Science in Sports & Exercise, vol. 43, p. 1378, July 2011.

[17] H. Hermens, B. Freriks, C. Disselhorst-Klug, and G. Rau, "Development of recommendations for semg sensors and sensor placement procedures," J. Electromyog. Kinesiol., vol. 10, pp. 361-74, October 2000.

[18] H. J. Hermens, B. Freriks, R. Merletti, D. Stegeman, J. Blok, G. Rau, C. Disselhorst-Klug, and G. H"agg, "Euro-

[19] S. Christoph, "The influence in airforce soldiers through wearing certain types of army-issue footwear on muscle activity in the lower extremities," Open Ortho. J., vol. 5, no. 1, p. 302-306, October 2011.

[20] X. Li, H. Shin, P. Zhou, X. Niu, J. Liu, and W. Rymer, "Power spectral analysis of surface electromyography (emg) at matched contraction levels of the first dorsal interosseous muscle in stroke survivors," Clin. Neurophysiol., vol. 125, November 2013.

[21] C. De Luca, L. Donald Gilmore, M. Kuznetsov, and S. Roy, "Filtering the surface emg signal: Movement artifact and baseline noise contamination," J. Biomech., vol. 43, pp. 1573-1679, March 2010.

[22] S. H Chung and C. Giuliani, "Within and between-session consistency of electromyographic temporal patterns of walking in non-disabled older adults," Gait & Posture—GAIT POSTURE, vol. 6, pp. 110-118, 10 1997.

[23] F. Pedregosa, G. Varoquaux, A. Gramfort, V. Michel, B. Thirion, O. Grisel, M. Blondel, P. Prettenhofer, R. Weiss, V. Dubourg, J. Vanderplas, A. Passos, D. Cournapeau, M. Brucher, M. Perrot, and E. Duchesnay, "Scikit-learn: Machine learning in Python," Journal of Machine Learning Research, vol. 12, pp. 2825-2830, 2011.

[24] F. Chollet et al., "Keras," https://github.com/fchollet/keras, 2015.

[25] G. V. Trunk, "A problem of dimensionality: A simple example," IEEE Trans. Pattern Anal. Mach. Intell., vol. 1, no. 3, pp. 306-307, March 1979. [Online]. Available: http://dx.doi.org/10.1109/TPAMI.1979.4766926

[26] T. R. Farrell and R. F. Weir, "The optimal controller delay for myoelectric prostheses," IEEE Transactions on Neural Systems and Rehabilitation Engineering, vol. 15, no. 1, pp. 111-118, March 2007.

We claim:

1. A control subsystem for controlling an actuator of an exoskeleton based on a future movement intent of a user, the control subsystem comprising:
   a control database storing a historical movement library;
   a current intent classifier configured to determine a current movement intent of the user based on a sensor data and the historical movement library;
   a future intent classifier configured to determine a future movement intent of the user based on the current movement intent of the user;
   a motor control module configured to determine a command to be communicated to an actuator of the exoskeleton; and
   the command is based on the future movement intent of the user.

2. The control subsystem of claim 1 wherein the sensor data comprises an anticipatory data value from an anticipatory sensor.

3. The control subsystem of claim 1 wherein the sensor data comprises an anticipatory data value from an electromyography (EMG) sensor.

4. The control subsystem of claim 1 wherein:
   the sensor data comprises an anticipatory data value from an electromyography (EMG) sensor; and
   the anticipatory data value representing a muscle movement of the user that has not occurred.

5. The control subsystem of claim 1 wherein the current intent classifier is configured to determine the current movement intent of the user according to a probabilistic pattern recognition technique.

6. The control subsystem of claim 1 wherein the future intent classifier is configured to determine the future movement intent of the user according to a probabilistic pattern recognition technique.

7. The control subsystem of claim 1 wherein the current intent classifier is configured to determine the current movement intent of the user according to a K-Nearest Neighbor algorithm.

8. The control subsystem of claim 1 wherein the future intent classifier is configured to determine the future movement intent of the user according to a K-Nearest Neighbor algorithm.

9. The control subsystem of claim 1 further comprising a current task classifier configured to determine a current movement task of the user according to a probabilistic pattern recognition technique.

10. The control subsystem of claim 1 further comprising a current task classifier configured to determine a current movement task of the user according to a K-Nearest Neighbor algorithm.

11. An enhanced exoskeleton system comprising the control subsystem of claim 1, the enhanced exoskeleton system further comprising:
    a sensor-embedded textile base layer configured to sense the sensor data and communicate the sensor data to the control subsystem; an active exoskeleton in communication with the control subsystem and configured to be controlled by the actuator; and
    the textile base layer comprises an electromyography (EMG) sensor configured to communicate an anticipatory data value representing a muscle movement yet to occur.

* * * * *